(12) United States Patent
Pandit et al.

(10) Patent No.: US 12,423,125 B2
(45) Date of Patent: Sep. 23, 2025

(54) METHODS AND SYSTEMS FOR STORAGE VIRTUAL MACHINE MIGRATION BETWEEN CLUSTERS OF A NETWORKED STORAGE SYSTEM

(71) Applicant: NETAPP, INC., San Jose, CA (US)

(72) Inventors: Atul Ramesh Pandit, Los Gatos, CA (US); Kalaivani Arumugham, Sunnyvale, CA (US); Akhil Kaushik, Bangalore (IN); Ching-Yuk Paul Ngan, Redwood City, CA (US); Kazunobu Nishime, Milpitas, CA (US); Rakesh Bhargava M R, Bangalore (IN); William R. Taylor, San Jose, CA (US)

(73) Assignee: NETAPP, INC., San Jose, CA (US)

( * ) Notice: Subject to any disclaimer, the term of this patent is extended or adjusted under 35 U.S.C. 154(b) by 489 days.

(21) Appl. No.: 17/729,885

(22) Filed: Apr. 26, 2022

(65) Prior Publication Data
US 2023/0137443 A1 May 4, 2023

(30) Foreign Application Priority Data
Oct. 29, 2021 (IN) .............................. 202141049497

(51) Int. Cl.
*G06F 9/455* (2018.01)
*G06F 9/50* (2006.01)

(52) U.S. Cl.
CPC ........ *G06F 9/45558* (2013.01); *G06F 9/5016* (2013.01); *G06F 9/5072* (2013.01);
(Continued)

(58) Field of Classification Search
CPC .. G06F 9/45558; G06F 9/5016; G06F 9/5072; G06F 2009/4557;
(Continued)

(56) References Cited

U.S. PATENT DOCUMENTS

| | | | |
|---|---|---|---|
| 8,667,490 B1 * | 3/2014 | van der Goot | G06F 9/45533 718/1 |
| 9,083,724 B2 | 7/2015 | Karnawat et al. | |

(Continued)

OTHER PUBLICATIONS

Dhawale A., "SnapMirror Configuration and Best Practices Guide for ONTAP 9—Updated for Ontap 9.8," Netapp, TR-4015 Version 5.2, pp. 1-62, (2021).

(Continued)

*Primary Examiner* — April Y Blair
*Assistant Examiner* — Jonathan R Labud
(74) *Attorney, Agent, or Firm* — LOZA & LOZA, LLP

(57) ABSTRACT

Methods and systems for Vserver migration are provided. One method includes executing a transfer phase of a migrate operation for migrating a Vserver of a source cluster to a destination cluster, using asynchronous baseline transfer to transfer a plurality of source storage volumes configured in a consistency group (CG) for the migrate operation to a plurality of destination storage volumes of a destination cluster; updating a state of each of the plurality of source storage volumes to a sync state indicating completion of a pre-commit phase of the migrate operation to initiate a commit phase of the migrate operation; and generating a snapshot of the plurality of destination storage volumes for performing data integrity checks between data stored at the source cluster and migrated data at destination cluster, after completing a commit phase of the migrate operation.

20 Claims, 22 Drawing Sheets

Setup Phase 500

(52) U.S. Cl.
CPC .... *G06F 9/5077* (2013.01); *G06F 2009/4557* (2013.01); *G06F 2009/45579* (2013.01); *G06F 2009/45583* (2013.01); *G06F 2009/45595* (2013.01)

(58) Field of Classification Search
CPC . G06F 2009/45579; G06F 2009/45583; G06F 9/5077; G06F 2009/45595
See application file for complete search history.

(56) References Cited

U.S. PATENT DOCUMENTS

| | | |
|---|---|---|
| 9,928,107 B1 | 3/2018 | Vincent |
| 9,933,957 B1 | 4/2018 | Cohen et al. |
| 9,959,063 B1 | 5/2018 | Meiri et al. |
| 10,185,507 B1 | 1/2019 | Olson et al. |
| 10,852,980 B1 | 12/2020 | Specht et al. |
| 11,048,546 B1 | 6/2021 | Shibayama et al. |
| 11,366,828 B1 | 6/2022 | Srikantan et al. |
| 2012/0191980 A1* | 7/2012 | Kennedy ............ G06F 21/6236 726/3 |
| 2012/0278553 A1* | 11/2012 | Mudhiganti ............ G06F 16/25 711/E12.002 |
| 2013/0318210 A1 | 11/2013 | Lent et al. |
| 2014/0181015 A1* | 6/2014 | Bonzini ................ G06F 16/273 707/613 |
| 2014/0359058 A1 | 12/2014 | Karnawat et al. |
| 2015/0169414 A1 | 6/2015 | Lalsangi et al. |
| 2015/0172111 A1 | 6/2015 | Lalsangi et al. |
| 2017/0090972 A1 | 3/2017 | Ryu et al. |
| 2017/0242764 A1 | 8/2017 | Antony et al. |
| 2018/0232249 A1 | 8/2018 | Keohane et al. |
| 2019/0034422 A1 | 1/2019 | Chen |
| 2019/0129616 A1 | 5/2019 | Nguyen et al. |
| 2019/0278662 A1* | 9/2019 | Nagrale ................ G06F 16/128 |
| 2020/0034077 A1 | 1/2020 | Haravu et al. |
| 2020/0265008 A1 | 8/2020 | Vully et al. |
| 2021/0109830 A1 | 4/2021 | Venugopal et al. |
| 2022/0092024 A1 | 3/2022 | Kavaipatti Anantharamakrishnan et al. |
| 2023/0023025 A1 | 1/2023 | Shetty et al. |
| 2023/0133014 A1 | 5/2023 | Pandit et al. |
| 2023/0136363 A1 | 5/2023 | Pandit et al. |
| 2023/0229579 A1* | 7/2023 | Rayev ................ G06F 16/1734 702/186 |

OTHER PUBLICATIONS

Dufrasne B., et al., "IBM XIV Storage System Business Continuity Functions," IBM Redbooks, Sixth edition, Chapters 1, 3-6, 9, 10, (2014).
IBM., "Clustered Data ONTAP 8.2 Logical Storage Management Guide," IBM System Storage N series, SC27-6277, pp. 1-212 (2014).
Non-Final Office Action mailed on Dec. 18, 2024 for U.S. Appl. No. 17/729,870, filed Apr. 26, 2022, 12 pages.
Technical Report., "Best Practices for Scalable SAN," Michael Peppers, NetApp, TR-4080 Version 5, pp. 1-11 (2017).
Non-Final Office Action mailed on Mar. 26, 2025 for U.S. Appl. No. 17/729,900, filed Apr. 26, 2022, 16 pages.
Cluster and SVM Peering Power Guide, Lenovo, 6th edition, 2021, 36 pages.
Final Office Action mailed on May 8, 2025 for U.S. Appl. No. 17/729,870, filed Apr. 26, 2022, 13 pages.
Fujitsu Storage Eternus AX/HX Series—MetroCluster® IP Installation and Configuration Guide Fujitsu Limited; Doc ID: A3CA08733-A234-04; Published Sep. 2021 pp. 1, 6-32, 128-142 (2021).
Lippe K., "Ethernet Storage Design Considerations and Best Practices for Clustered Data ONTAP Configurations," NetApp, Version 1.2, Doc ID TR-4182-0216, Technical Report, 2016, 45 pages.
Network Management Guide—ONTAP® 9 Lenovo, 2021, 144 pages.

* cited by examiner

Post Cut-over and Final Cleanup 509

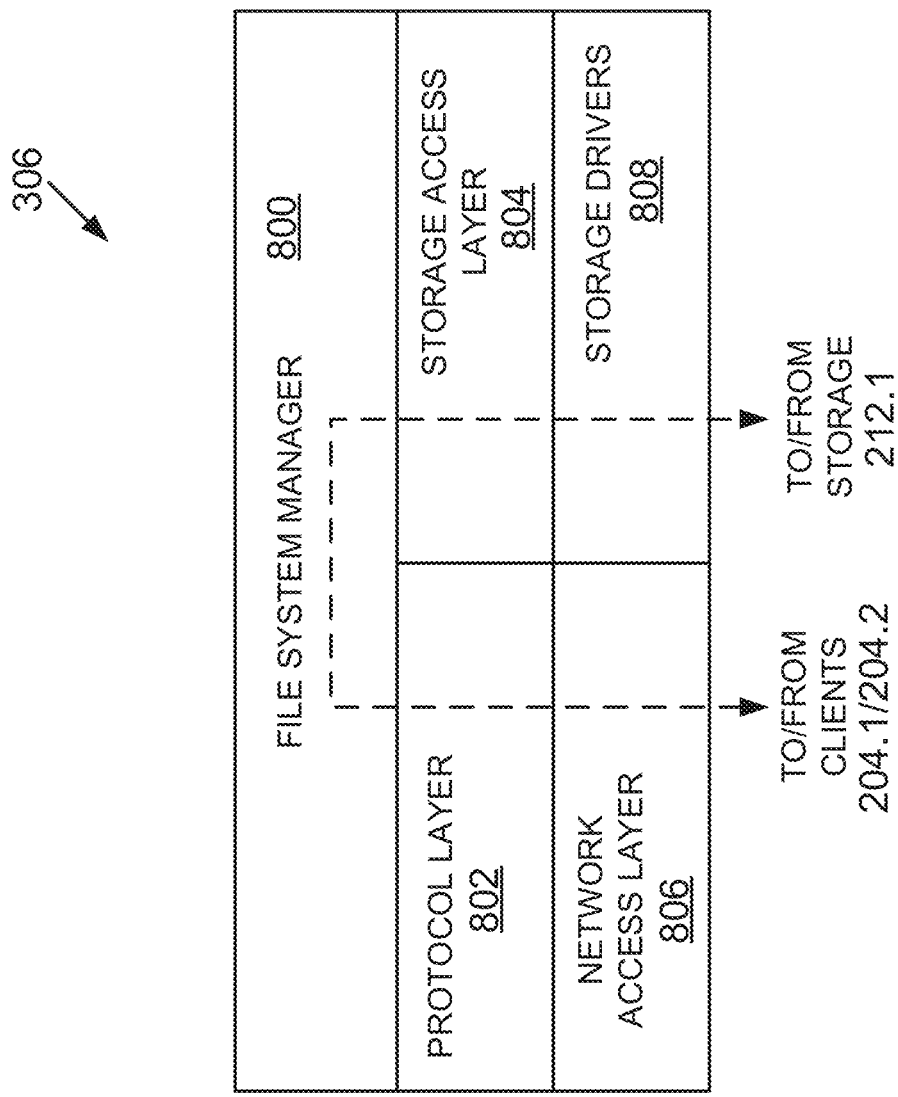

METHODS AND SYSTEMS FOR STORAGE VIRTUAL MACHINE MIGRATION BETWEEN CLUSTERS OF A NETWORKED STORAGE SYSTEM

CROSS-REFERENCE TO RELATED APPLICATIONS

This patent application claims priority under 35 U.S.C. 119(a) to the Provisional Indian Patent Application, Serial No. 202141049497, entitled "METHODS AND SYSTEMS FOR STORAGE VIRTUAL MACHINE MIGRATION BETWEEN CLUSTERS OF A NETWORKED STORAGE SYSTEM", filed on Oct. 29, 2021, the disclosure of which is incorporated herein by reference in its entirety.

Technical Field

The present disclosure relates to storage systems and more particularly, to storage virtual machine (also referred to as a "Vserver")) migration from a source cluster to a destination cluster of a networked storage environment.

Background

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server"), which is a computer processing system configured to store and retrieve data on behalf of one or more client computing systems ("clients"). The storage system may be presented to a client system as a virtual storage system (also interchangeably referred to as a storage virtual machine ("SVM") or "Vserver" throughout this specification) with storage space for storing information. The Vserver is associated with a physical storage system but operates as an independent system for handling client input/output (I/O) requests.

A Vserver may be migrated from one source cluster to a destination cluster. The term cluster in this sense means a configuration that includes a plurality of nodes/modules (e.g., network modules and storage modules) to enable access to networked storage. It is desirable to efficiently complete a migration operation from the source cluster to the destination cluster with minimal disruption to client computing systems that use the Vserver to store and retrieve data. Continuous efforts are being made to develop technology for efficiently migrating a Vserver from one cluster to another.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures:

FIG. 8 shows a block diagram of a storage operating system, used according to one aspect of the present disclosure.

DETAILED DESCRIPTION

Figure 1:
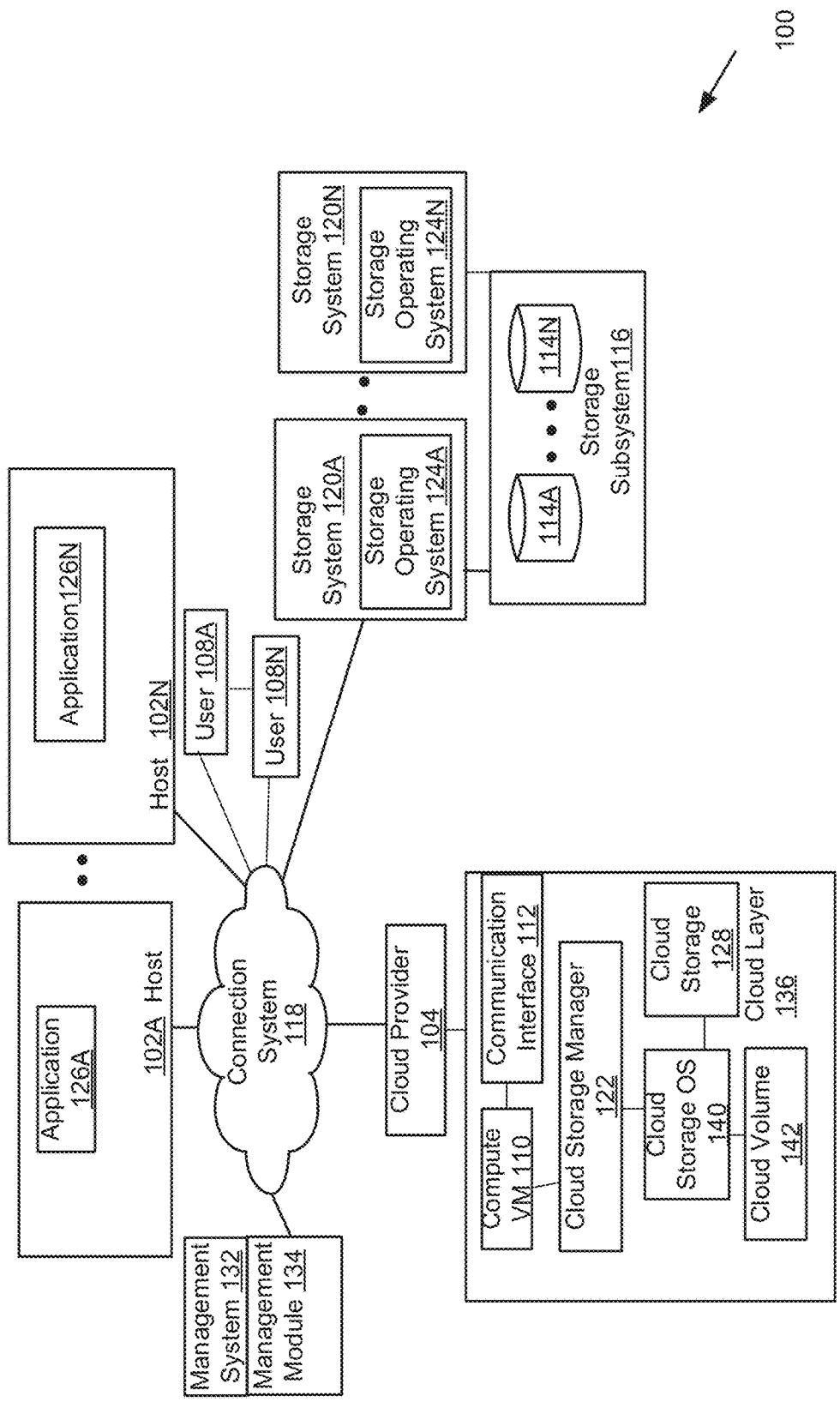
FIG. 1 shows an example of a storage environment, used according to one aspect of the present disclosure.

In one aspect, innovative technology is provided to migrate a Vserver (also referred to as a storage virtual machine ("SVM"), or a virtual storage system) from a source cluster to a destination cluster of a networked storage system. Vservers are typically used in a storage cluster architecture, described below. Typically, a data center may use multiple clusters. A Vserver is a data container in a clustered storage system that enables access to storage. It is desirable to move a Vserver from one cluster to another with minimal or non-disruption. Non-disruption in this context means a maximum acceptable duration when a client application executed by a client computing system does not receive a response from the networked storage system. The innovative technology disclosed herein enables efficient transfer of Vserver configuration information along with constituent data volumes that store application data and volume metadata from the source cluster to the destination cluster. From a client system's perspective there is no disruption to data access.

In one aspect, the Vserver migration process includes various phases, including a setup phase, a transfer phase, a cutover commit phase, post cutover phase and a final cleanup phase, described below in detail. The various aspects of the present disclosure include at least the following innovative features of the various phases of a migrate operation:

Setup Phase: Group Control (by a storage module (e.g., 216, FIG. 2)): During this phase, a group is created of the volumes belonging to a source Vserver (e.g., 320, FIG. 3C) in the storage module. Group control exists close to a data transfer engine (e.g., 348/349, FIG. 3C) in the storage module, which allows for efficient interaction between a control plane (e.g., 338, FIG. 3C) and a data transfer engine in a data plane (e.g., 340, FIG. 3C) that transfers data to a destination cluster (e.g., 328, FIG. 3B).

Orchestration (Failure Handling): Separate master processes (e.g., 342 and 404, FIG. 4A) are executed in the source cluster (e.g., 326, FIG. 3C) and destination cluster (e.g., 328, FIG. 4A) to handle failure scenarios. Recovery is based on idempotent principle (implemented by all components). Types of failure handling includes—cluster failure, node failure, process failure, network port failure, network partitioning and others, as described below in detail.

LIF (Logical Interface) or volume placement includes granular volume and aggregate placement that supports volume to aggregate maps at the destination cluster. Volume placement is based on properties including capacity, storage tiers, user preference and others as described below in detail. LIF placement ensures volume affinity to avoid cross-node traffic after migrating; and source volume configuration is preserved.

Transfer Phase: During this phase, data transfers are performed using an asynchronous transfer engine (e.g., 348, FIG. 4A); and a migration operation can be "paused" for additional control within a migrate outage window, described below in detail.

Cutover Pre-commit Phase: During this phase, relationships are transferred to a synchronous engine to ensure a short cutover window. NFS (Network File System) delegations are revoked to prepare for cutover.

Cutover Commit Phase: During this phase, locking mechanism (PONR (Point of no return) technique) is used to avoid split-brain scenarios and a persistent state at replicated databases (e.g., 432A/432B, FIG. 4A) is maintained on both the source and destination clusters. PONR in the cutover phase means that the source Vserver cannot be accessed from the source cluster, as described below in detail. A snapshot can be taken at the point of cutover for data integrity check after cutover. The term snapshot in this context means a point-in-time copy that captures all the information in a storage volume.

Post Cutover Phase: During this phase, the last volume configuration is fetched and applied on the destination cluster.

Cleanup Phase: During this phase, a source Vserver is preserved for data integrity before deletion. This allows for the source Vserver to be brought back as a primary Vserver, if there is a failure, as described below in detail.

As a preliminary note, as used in this disclosure, the terms "component" "module", "system," and the like are intended to refer to a computer-related entity, either software-executing general-purpose processor, hardware, firmware, and a combination thereof. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon.

The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on non-transitory computer readable media including, but not limited to, an ASIC (application specific integrated circuit), CD (compact disc), DVD (digital video disk), ROM (read only memory), flash memory, hard disk, EEPROM (electrically erasable programmable read only memory), or any other storage device, in accordance with the claimed subject matter.

Storage Environment 100: FIG. 1 shows an example of a networked operating environment 100 (also referred to as system 100) used according to various aspects of the present disclosure. As an example, system 100 may include a plurality of storage systems 120A-120N (may also be referred to as storage server/storage servers/storage controller/storage controllers 120, and also referred to as an "on-premise" storage system 120) executing a storage operating system 124A-124N (may also be referred to as storage operating system 124 or storage operating systems 124). In one aspect, the storage system 120 (or a cloud storage OS 140, described below in detail) can be organized into any suitable number of Vservers, in which each Vserver represents a single storage system namespace with a separate network access. Each Vserver has a specific client domain and a security domain that are separate from a client system and a security domain of other Vservers. Moreover, each Vserver can span one or more physical nodes, each of which can hold storage associated with one or more Vservers.

Each Vserver is addressable by client systems and handles input/output (also referred to as "I/O" or "IO") commands, just like storage system 120. Each Vserver is associated with a physical storage system (e.g., a storage sub-system 116). Each Vserver is assigned a unique access address that is used by a client computing system to access the storage system 120. For example, each Vserver is assigned an Internet Protocol (IP) address (also referred to as a LIF) that is used by a client system to send I/O commands. The IP address from an IP address space may be assigned when the Vserver is configured using a management module 134 executed by a management system 132.

System 100 also includes a plurality of computing systems 102A-102N (shown as host 102, 102A-102N and may also be referred to as a "host system 102", "host systems 102", "server 102" or "servers 102") and user systems 108A-108N (may also be referred to as "user system 108," "user systems 108," "client system 108" or "client systems 108") that may access storage space provided by a cloud layer 136 and/or the storage-subsystem 116 managed by the storage systems 120 (or Vservers) via a connection system 118 such as a local area network (LAN), wide area network (WAN), the Internet and others. The storage-subsystem 116 includes a plurality of storage devices 114A-114N (may also be referred to as storage device/storage devices/disk/disks 114). It is noteworthy that the term "disk" as used herein is intended to mean any storage device/space and not to limit the adaptive aspects to any particular type of storage device, for example, hard disks.

In one aspect, the storage system 120 uses the storage operating system 124 to store and retrieve data from the storage sub-system 116 by accessing the storage devices 114. Data is stored and accessed using read and write requests that are also referred to as input/output (I/O) requests. The storage devices 114 may be organized as one or more RAID groups. The various aspects disclosed herein are not limited to any storage device type or storage device configuration.

In one aspect, system 100 includes the cloud layer 136 having a cloud storage manager (may also be referred to as "cloud manager") 122, and a cloud storage operating system (may also be referred to as "Cloud Storage OS") 140 having access to cloud storage 128. The cloud storage manager 122 enables configuration and management of storage resources.

The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud specific services.

As an example, a cloud provider 104, provides access to the cloud layer 136 and its components via a communication interface 112. A non-limiting example of the cloud layer 136 is a cloud platform, e.g., Amazon Web Services ("AWS") provided by Amazon Inc., Azure provided by Microsoft Corporation, Google Cloud Platform provided by Alphabet Inc. (without derogation of any trademark rights of Amazon Inc., Microsoft Corporation or Alphabet Inc.), or any other cloud platform. In one aspect, communication interface 112 includes hardware, circuitry, logic and firmware to receive and transmit information using one or more protocols. As an example, the cloud layer 136 can be configured as a virtual private cloud (VPC), a logically isolated section of a cloud infrastructure that simulates an on-premises data center with the on-premise, storage system 120.

In one aspect, the cloud manager 122 is provided as a software application running on a computing device or within a virtual machine ("VM") for configuring, protecting and managing storage objects. In one aspect, the cloud manager 122 enables access to a storage service (e.g., backup, restore, cloning or any other storage related service) from a "micro-service" made available from the cloud layer 136. In one aspect, the cloud manager 122 stores user information including a user identifier, a network domain for a user device, a user account identifier, or any other information to enable access to storage from the cloud layer 136.

Software applications for cloud-based systems are typically built using "containers," which may also be referred to as micro-services. Kubernetes is an open-source software platform for deploying, managing and scaling containers including the cloud storage OS 140, and the cloud manager 122. Azure is a cloud computing platform provided by Microsoft Corporation (without derogation of any third-party trademark rights) for building, testing, deploying, and managing applications and services including the cloud storage OS 140, and cloud manager 122. Azure Kubernetes Service enables deployment of a production ready Kubernetes cluster in the Azure cloud for executing the cloud storage OS 140, and the cloud manager 122. It is noteworthy that the adaptive aspects of the present disclosure are not limited to any specific cloud platform.

The term micro-service as used herein denotes computing technology for providing a specific functionality in system 100 via the cloud layer 136. As an example, the cloud storage OS 140, and the cloud manager 122 are micro-services, deployed as containers (e.g., "Docker" containers), stateless in nature, may be exposed as a REST (representational state transfer) application programming interface (API) and are discoverable by other services. Docker is a software framework for building and running micro-services using the Linux operating system kernel (without derogation of any third-party trademark rights). As an example, when implemented as docker containers, docker micro-service code for the cloud storage OS 140, and the cloud manager 122 is packaged as a "Docker image file". A Docker container for the cloud storage OS 140, and the cloud manager 122 is initialized using an associated image file. A Docker container is an active or running instantiation of a Docker image. Each Docker container provides isolation and resembles a lightweight virtual machine. It is noteworthy that many Docker containers can run simultaneously in a same Linux based computing system. It is noteworthy that although a single block is shown for the cloud manager 122 and the cloud storage OS 140, multiple instances of each micro-service (i.e., the cloud manager 122 and the cloud storage OS 140) can be executed at any given time to accommodate multiple user systems 108.

In one aspect, the cloud manager 122 and the cloud storage OS 140 can be deployed from an elastic container registry (ECR). As an example, ECR is provided by AWS (without derogation of any third-party trademark rights) and is a managed container registry that stores, manages, and deploys container images. The various aspects described herein are not limited to the Linux kernel or using the Docker container framework.

An example of the cloud storage OS 140 includes the "CLOUD VOLUMES ONTAP" provided by NetApp Inc., the assignee of this application. (without derogation of any trademark rights) The cloud storage OS 140 is a software defined version of a storage operating system 124 executed within the cloud layer 136 or accessible to the cloud layer 136 to provide storage and storage management options that are available via the storage system 120. The cloud storage OS 140 has access to cloud storage 128, which may include block-based, persistent storage that is local to the cloud storage OS 140 and object-based storage that may be remote to the cloud storage OS 140.

In another aspect, in addition to cloud storage OS 140, a cloud-based storage service is made available from the cloud layer 136 to present storage volumes (shown as cloud volume 142). An example of the cloud-based storage service is the "Cloud Volume Service," provided by NetApp Inc. (without derogation of any trademark rights). The term volume or cloud volume (used interchangeably throughout this specification) means a logical object, also referred to as a storage object, configured to store data files (or data containers or data objects), scripts, word processing documents, executable programs, and any other type of structured or unstructured data. From the perspective of a user system 108, each cloud volume can appear to be a single storage drive. However, each cloud volume can represent the storage space in one storage device, an aggregate of some or all the storage space in multiple storage devices, a RAID group, or any other suitable set of storage space. The various aspects of the present disclosure may include both the Cloud storage OS 140 and the cloud volume service or either one of them.

As an example, user systems 108 are computing devices that can access storage space at the storage system 120 via the connection system 118 or from the cloud layer 136 presented by the cloud provider 104 or any other entity. The user systems 108 can also access computing resources, as a VM (e.g., compute VM 110) via the cloud layer 136. A user may be the entire system of a company, a department, a project unit or any other entity. Each user system is uniquely identified and optionally, may be a part of a logical structure called a storage tenant (not shown). The storage tenant represents a set of users (may also be referred to as storage consumers) for the cloud provider 104 that provides access to cloud-based storage and/or compute resources (e.g., 110) via the cloud layer 136 and/or storage managed by the storage system 120.

In one aspect, host systems 102 are configured to also execute a plurality of processor-executable applications 126A-126N (may also be referred to as "application 126" or "applications 126"), for example, a database application, an email server, and others. These applications may be executed in different operating environments, for example, a virtual machine environment, Windows, Solaris, Unix (without derogation of any third-party rights) and others. The applications 126 use storage system 120 or cloud storage 128 to store information at storage devices. Although hosts 102 are shown as stand-alone computing devices, they may be made available from the cloud layer 136 as compute nodes executing applications 126 within VMs (shown as compute VM 110).

Each host system 102 interfaces with the management module 134 of a management system 132 for managing backups, restore, cloning and other operations for the storage system 120. The management module 134 is used for managing and configuring various elements of system 100. Management system 132 may include one or more computing systems for managing and configuring the various elements of system 100. Although the management system 132 with the management module 134 is shown as a stand-alone module, it may be implemented with other applications, for example, within a virtual machine environment. Furthermore, the management system 132 and the management module 134 may also be referred to interchangeably throughout this specification.

In one aspect, the storage system 120 provides a set of storage volumes directly to host systems 102 via the connection system 118. In another aspect, the storage volumes are presented by the cloud storage OS 140, and in that context a storage volume is referred to as a cloud volume (e.g., 142). The storage operating system 124/cloud storage OS 140 present or export data stored at storage devices 114/cloud storage 128 as a volume (or a logical unit number (LUN) for storage area network ("SAN") based storage).

The storage operating system 124/cloud storage OS 140 are used to store and manage information at storage devices 114/cloud storage 128 based on a request generated by application 126, user 108 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more I/O requests are sent over connection system 118 to the storage system 120 or the cloud storage OS 140, based on the request. Storage system 120/cloud storage OS 140 receives the I/O requests, issues one or more I/O commands to storage devices 114/cloud storage 128 to read or write data on behalf of the host system 102 and issues a response containing the requested data over the network 118 to the respective host system 102.

Although storage system 120 is shown as a stand-alone system, i.e., a non-cluster-based system, in another aspect, storage system 120 may have a distributed architecture; for example, a cluster-based system that may include a separate network module and storage module, described below in detail. Briefly, the network module is used to communicate with host systems 102, while the storage module is used to communicate with the storage devices 114.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

As an example, one or more of the host systems (for example, 102A-102N) or a compute resource (not shown) of the cloud layer 136 may execute a VM environment where a physical resource is time-shared among a plurality of independently operating processor executable VMs (including compute VM 110). Each VM may function as a self-contained platform, running its own operating system (OS) and computer executable, application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resource may include one or more processors, resources resident on the processors (e.g., control registers, caches, and others), memory (instructions residing in memory, e.g., descriptor tables), and other resources (e.g., input/output devices, host attached storage, network attached storage or other like storage) that reside in a physical machine or are coupled to the host system.

Communication between the storage management application 118 and storage system 120 may be accomplished using any of the various conventional communication protocols and/or application programming interfaces (APIs), the details of which are not germane to the technique being introduced here. This communication can be done through the network 106 or it can be done via a direct link (not shown) between the management system 132 and one or more of the storage systems.

Clustered Networked Storage System: The aspects disclosed above have been described with respect to a non-cluster-based storage system 120 that may have a traditional monolithic architecture where a storage server has access to a dedicated storage subsystem. However, the adaptive aspects can be implemented in a cluster-based system that has a distributed architecture and where Vservers (222A-222N) can be migrated from one cluster to another. The cluster-based system is described below in detail.

Figure 2:
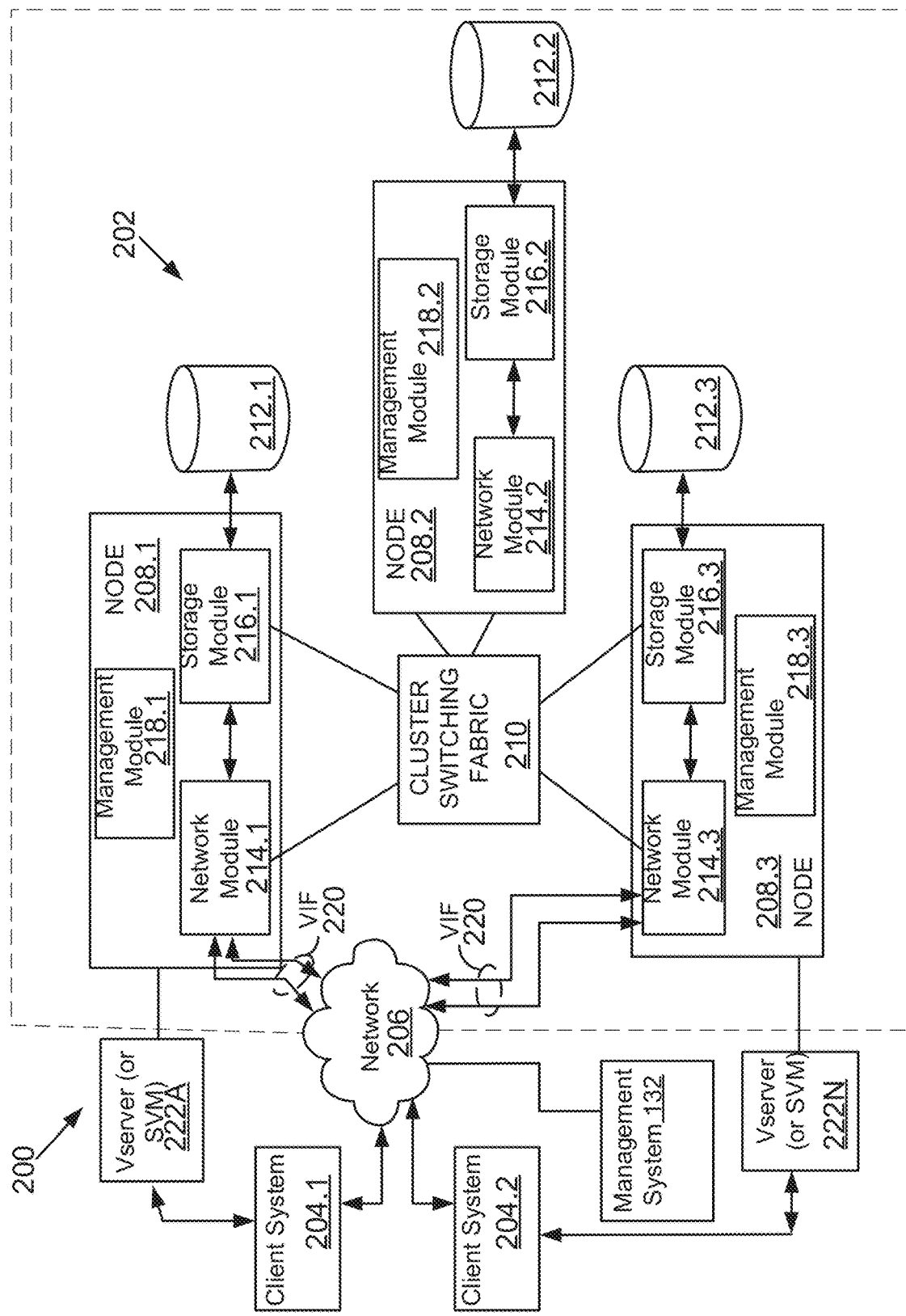
FIG. 2 shows a block diagram of a cluster-based storage system in a networked storage environment, used according to one aspect of the present disclosure.

FIG. 2 depicts an illustrative aspect of a storage environment 200 including a plurality of client systems 204.1-204.2 (similar to clients 108.1-109.N and host 102), a clustered storage system 202 and at least one network 206 communicably connecting the client systems 204.1-204.2 and the clustered storage system 202. As shown in FIG. 2, the clustered storage system 202 includes a plurality of nodes 208.1-208.3, a cluster switching fabric 210, and a plurality of mass storage devices 212.1-212.3 (similar to 114, FIG. 1)

Each of the plurality of nodes 208.1-208.3 is configured to include a network module, a storage module, and a management module, each of which can be implemented as a separate processor executable, or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3 that are part of a storage sub-system, similar to 116.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2 depicts only the VIFs 220 at the interfaces to the network modules 214.1, 214.3 for clarity of illustration.

The clustered storage system 202 can be organized into any suitable number of Vservers 222A-222N, in which each Vserver represents a single storage system namespace with separate network access. As mentioned above, each Vserver has a user domain and a security domain that are separate from the user and security domains of other virtual storage systems. Client systems 204 can access storage space via a Vserver from any node of the clustered system 202.

Each of the nodes 208.1-208.3 may be defined as a computer adapted to provide application services to one or more of the client systems 204.1-204.2. In this context, a Vserver is an instance of an application service provided to a client system. The nodes 208.1-208.3 are interconnected by the switching fabric 210, which, for example, may be embodied as a Gigabit Ethernet switch or any other switch type.

Although FIG. 2 depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspect s, the clustered storage system 202 may include a plurality of network modules and a plurality of storage modules interconnected in a configuration that does not reflect a one-to-one correspondence between the network modules and storage modules.

The client systems 204.1-204.2 of FIG. 2 may be implemented as general-purpose computers or VMs configured to interact with the respective nodes 208.1-208.3 in accordance with a client/server model of information delivery. In the presently disclosed aspect, the interaction between the client systems 204.1-204.2 and the nodes 208.1-208.3 enable the provision of network data storage services. Specifically, each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the NFS or CIFS protocol, when accessing information in the form of files and directories.

In a typical mode of operation, one of the client systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address, and that each VIF can migrate from network module to network module. The client request typically includes a file handle for a data file stored in a specified volume on at storage 212.1-212.3.

Figure 3A:
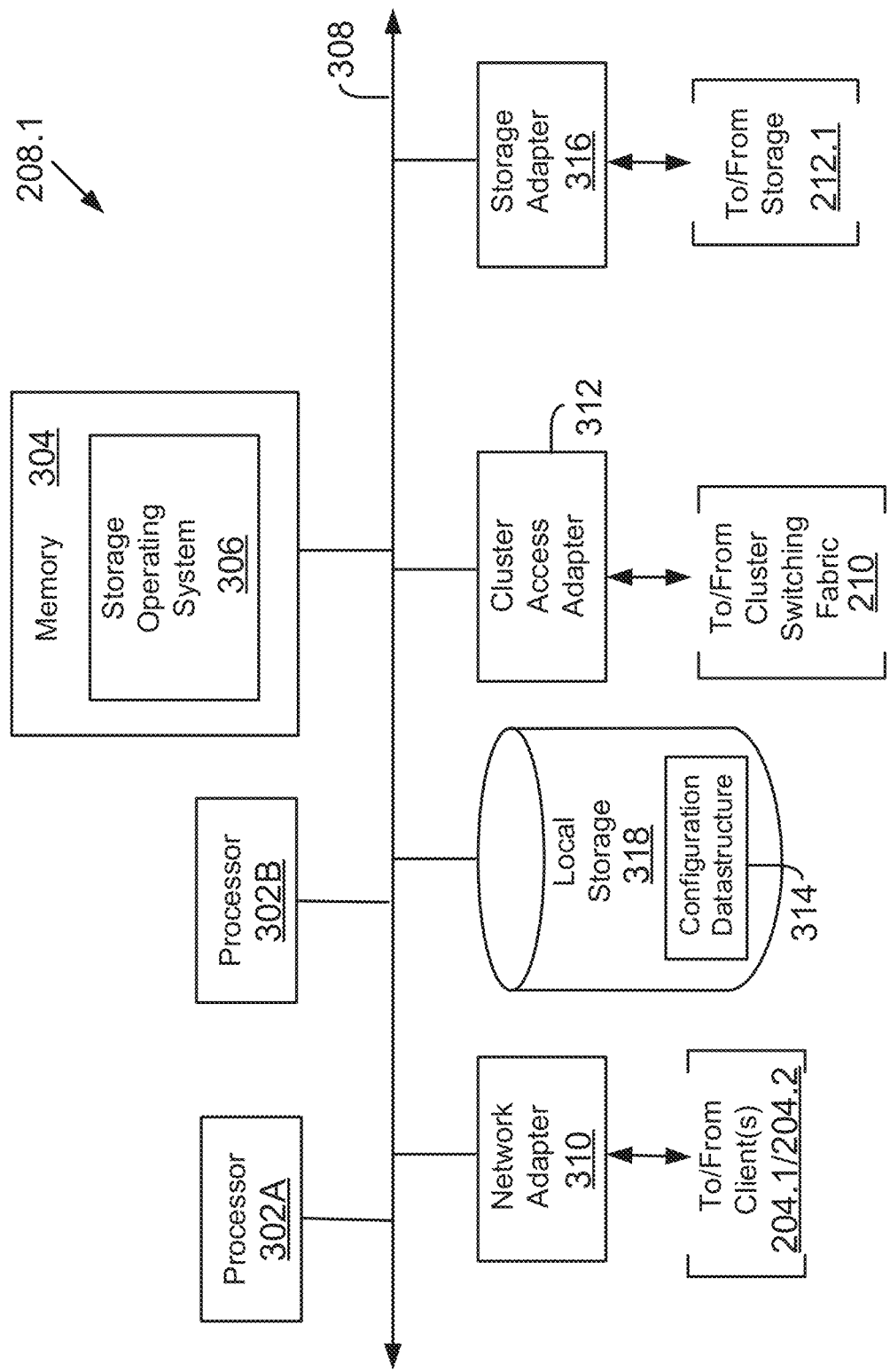
FIG. 3A shows an example of a node used in a cluster-based storage system, used according to one aspect of the present disclosure.

Storage System Node: FIG. 3A is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. The local storage 313 comprises one or more storage devices utilized by the node to locally store configuration information (e.g., in a configuration data structure 314).

Node 208.1 may manage a plurality of storage volumes for a Vserver that is migrated from one cluster to another. The system and processes for migrating Vservers are described below in more detail.

The cluster access adapter 312 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the network and storage modules are implemented on separate storage systems or computers, the cluster access adapter 312 is utilized by the network and storage modules for communicating with other network and storage modules in the cluster 100.

Each node 208.1 is illustratively embodied as a dual processor storage system executing a storage operating system 306 (similar to 124, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the network module 104 on the node, while the other processor 302B executes the functions of the storage module 216.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 306, portions of which is typically resident in memory and executed by the processing elements, functionally organizes the node 208.1 by, inter alia, invoking storage operations in support of the storage service implemented by the node.

The network adapter 310 comprises a plurality of ports adapted to couple the node 208.1 to one or more clients 204.1/204.2 over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.2 may communicate with the node over network 206 by exchanging discrete frames or packets of data according to pre-defined protocols, such as TCP/IP. In one aspect, LIF placement for a migrated Vserver involves selecting a port of the network adapter 310, as described below in detail.

The storage adapter 316 cooperates with the storage operating system 306 executing on the node 208.1 to access information requested by the clients. The information may be stored on any type of attached array of writable storage device media such as solid-state drives, optical, magnetic tape, bubble memory, storage class memory, electronic random-access memory, micro-electromechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology. It is noteworthy that instead of separate network adapter 310 and storage adapter 316, node 208.1 may use a converged adapter that performs the functionality of a storage adapter and a network adapter.

Figure 3B:
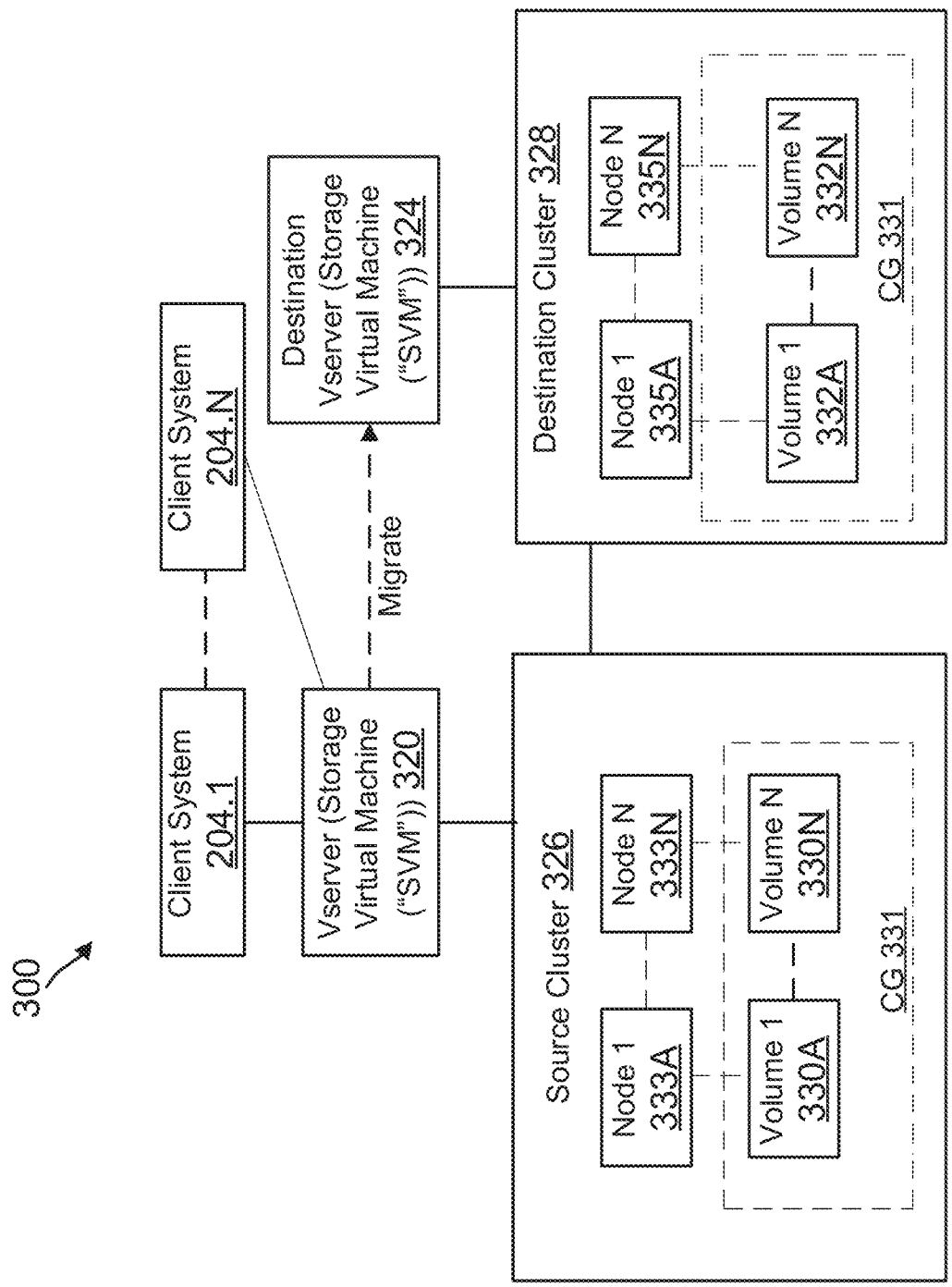
FIG. 3B shows migration of a source Vserver from a source cluster to a destination cluster, according to one aspect of the present disclosure.

Vserver Migration: FIG. 3B shows an example of migrating a source Vserver 320 from a source cluster 326 to a destination Vserver 324 at a destination cluster 328. Clusters 326 and 328 are similar to cluster 202 described above with respect to FIG. 2 having a plurality of nodes 208. The Vserver 320 is presented to clients 204. The clients 204 can read and write data using source storage volumes 330A-330N (may also be referred to as source volume or source volumes 330) at the source cluster 326. The storage volumes may be managed by one or more nodes 333A-333N (similar to nodes 208 of FIG. 2) of the source cluster 326.

Upon migration, the destination storage volumes 332A-332N (may also be referred to as destination volume or destination volumes 332) are managed by nodes 335A-335N (similar to nodes 208 of FIG. 2) of the destination cluster 328. For efficiently migrating the Vserver 320, the source volumes 330 are configured as a logical structure, referred to as consistency group ("CG") 331 that is uniquely identified. The CG 331 is used to implement group control for migrating the source volumes of Vserver 320 to the destination cluster 328, as described below in detail.

To migrate Vserver 320 during a migration operation, first the destination Vserver 324 is created at the destination cluster 328 during a setup phase. The destination volumes 332 are then created at the destination cluster 328 to store information associated with source volumes 330 at the source cluster 326. Details regarding the various migrate operation phases are provided below in detail.

Figure 3C:
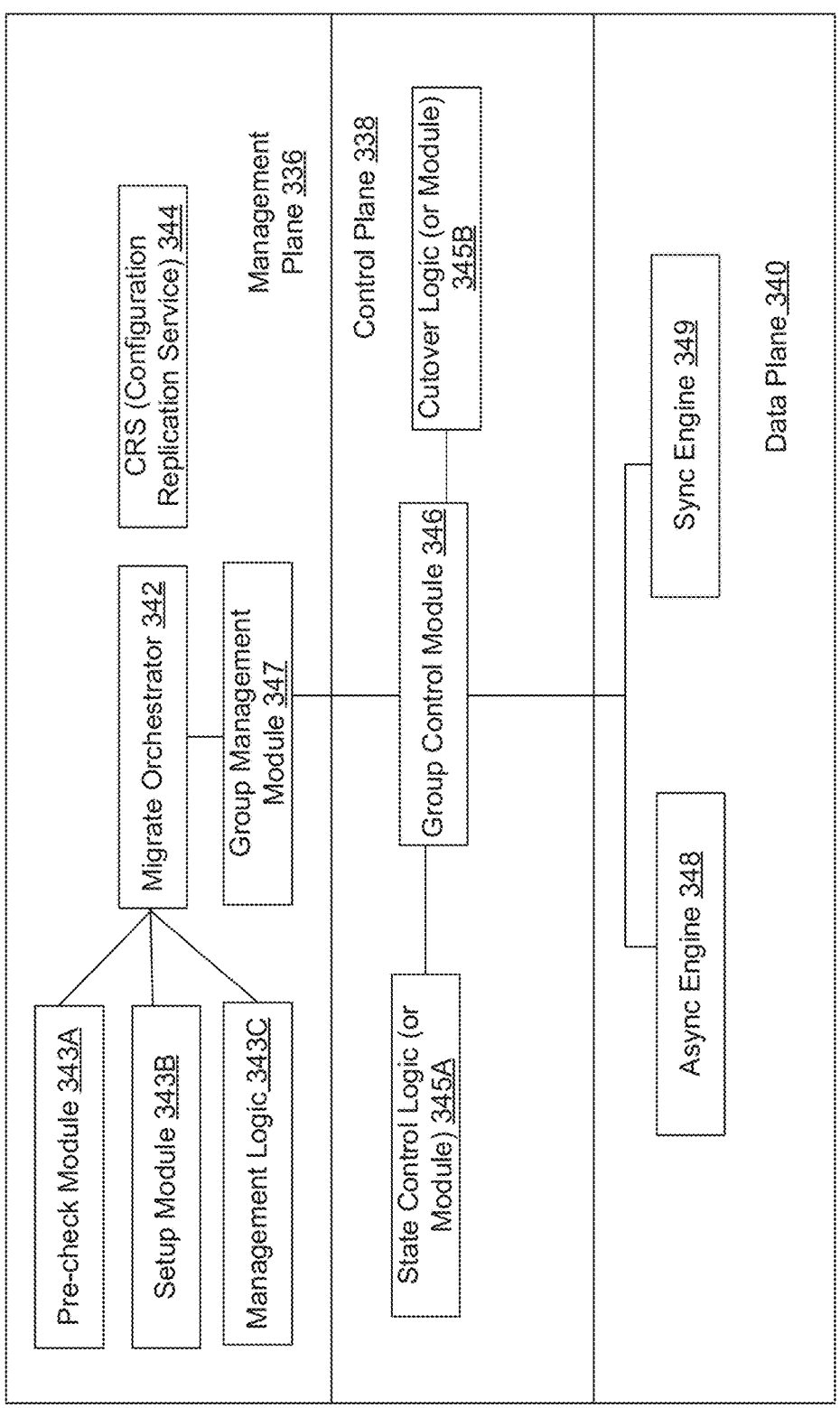
FIG. 3C shows a high-level block diagram of an architecture of a system for migrating the source Vserver, according to one aspect of the present disclosure.

Architecture 334: FIG. 3C shows a block diagram of an architecture 334 for executing the various phases of a migrate operation to migrate the source Vserver 320 from the source cluster 326 to the destination cluster 324, according to one aspect of the present disclosure. As an example, architecture 334 includes a management plane 336, a control plane 338 and a data plane 340, according to one aspect of the present disclosure. The management plane 338 may be implemented by a management module 218 (FIG. 2) and includes a migrate Orchestrator 342 (also referred to as Orchestator 342) that executes or interfaces with a plurality of threads/modules, e.g., a pre-check module 343A, a set-up module 343B and management logic 343C that are described below. The migrate Orchestrator 342 also interfaces with a configuration replication service (CRS) 344 that replicates configuration information of the source Vserver 320 to the destination cluster 328, also described below in detail. The configuration information pf the source Vserver 320 includes a source Vserver name, identifier, universal identifier ("UUID), nodes that are associated with the Vserver, client systems that can access the Vserver with associated permissions, the volume identifiers identifying volumes 330 or any other information. The configuration information also includes information regarding the volumes, e.g., volume identifiers, volume size, volume attributes e.g., if the volumes have a space guarantee, if the volume is thin provisioned, any quality of service associated with the volumes, access control information indicating the permissions associated with each volume 330 or any other information. The management plane 336 also includes a group management module 347 that manages migration of information for source volumes 330 as a CG (e.g., 331, FIG. 3B), also described below in detail.

The control plane 338 executes a group control module 346 that includes or interfaces with state control logic 345A, cut-over logic 345B. The state control logic 345A maintains the state of the migrate operation, as described below, while the cut-over logic 345B controls a cut-over phase of the migrate operation, also described below in detail.

The data plane 340 includes an asynchronous engine 348 that enables asynchronous transfer of data of the plurality of source volumes 330 in the CG 331. The data plane 340 also includes a synchronous engine 349 that is used to transfer information to the destination cluster 328 during a cutover phase. In one aspect, the data plane is implemented at the storage modules 216 that is closer to the storage devices 212. This improves the overall efficiency for migrating the Vserver 320, as described below in detail.

Figure 4A:
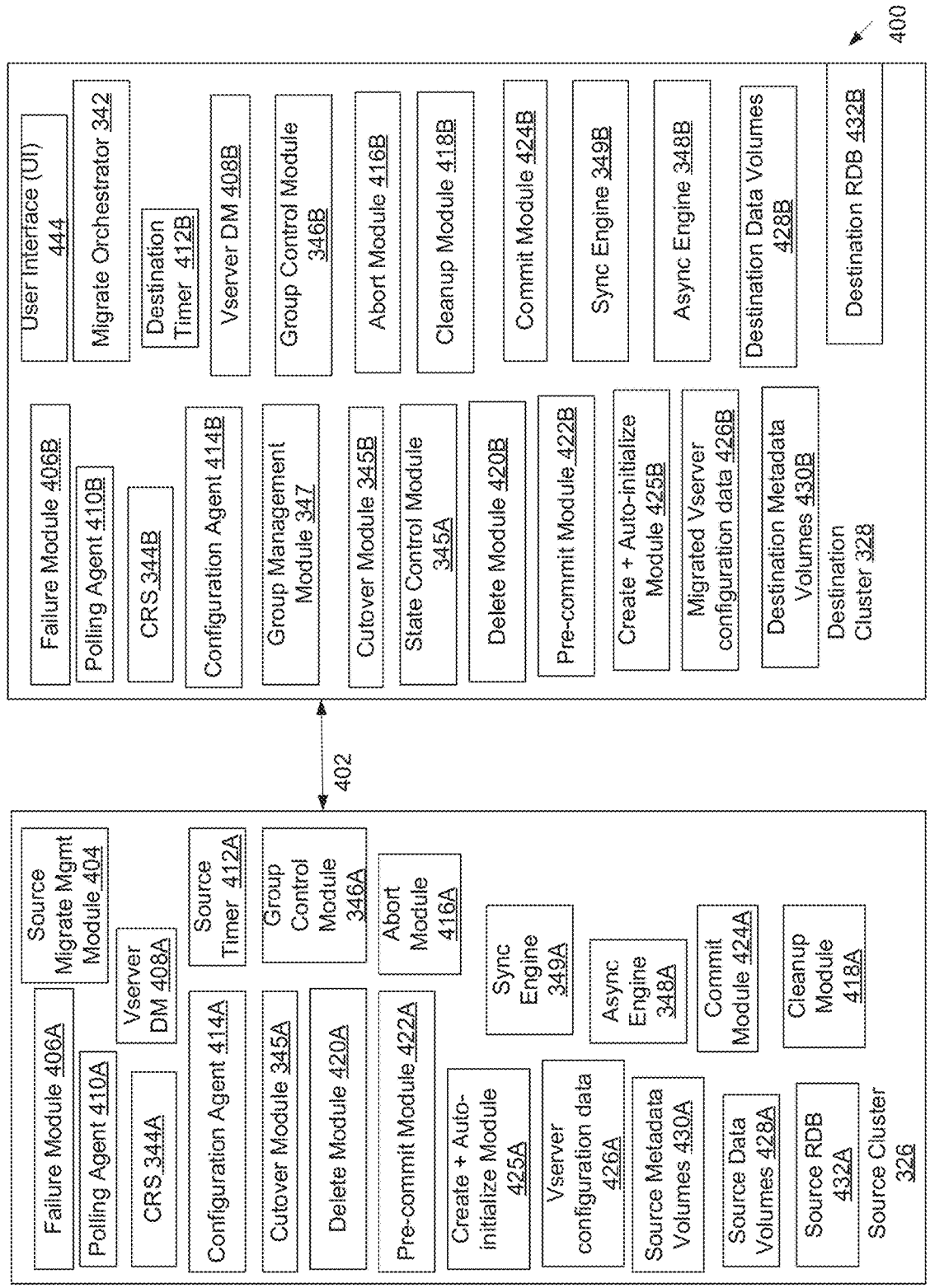
FIG. 4A shows a detailed block level diagram of a system for migrating the source Vserver, according to one aspect of the present disclosure.
Figure 4B:
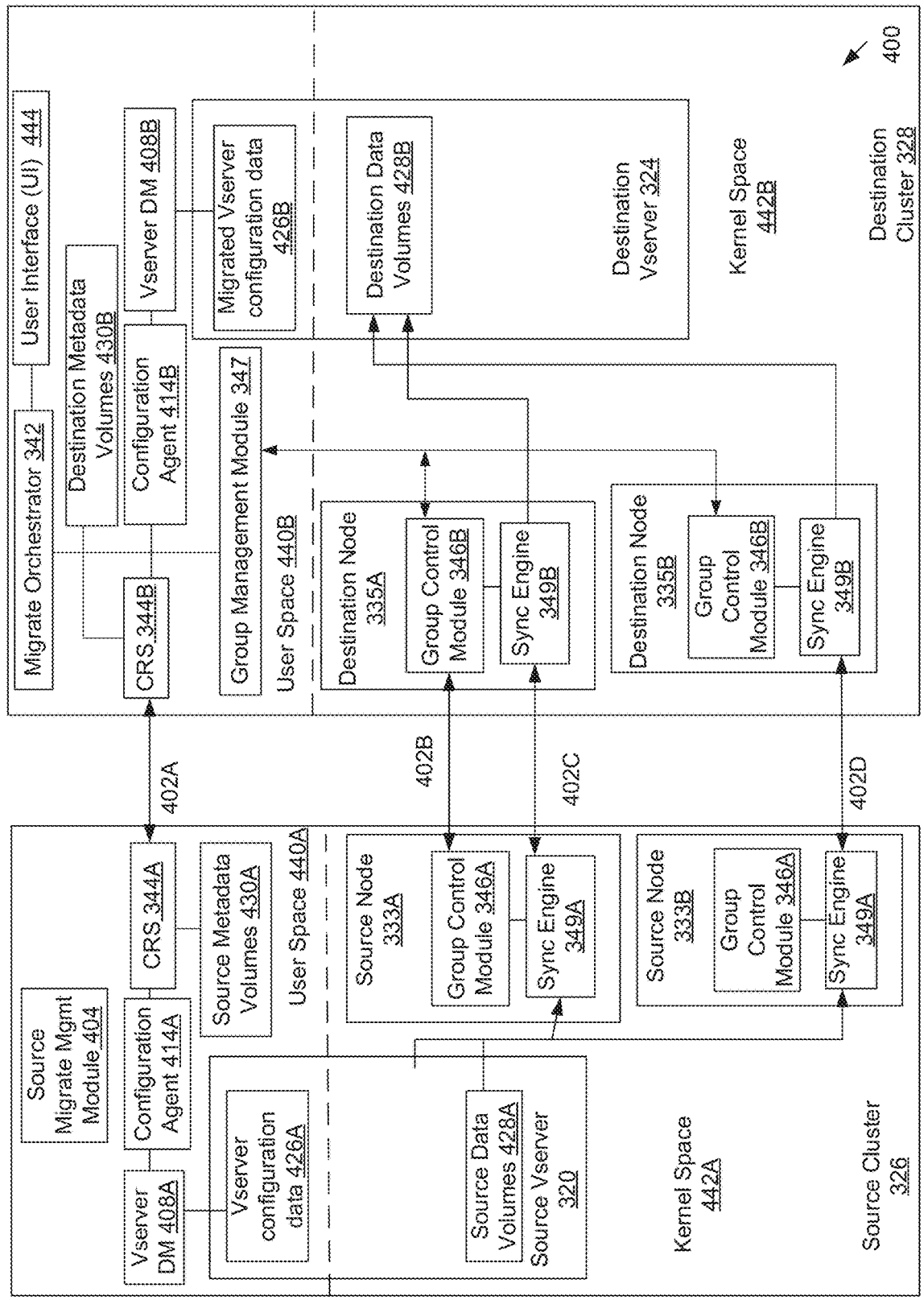
FIG. 4B shows another block level diagram of a system for migrating the source Vserver, according to one aspect of the present disclosure.

System 400: FIGS. 4A-4B shows examples of an innovative architecture 400 to enable migration between the source cluster 326 and the destination cluster 328, according to one aspect of the present disclosure. The following provides a brief description of the various components of FIGS. 4A/4B, and a brief introduction of certain terms used in this disclosure, according to one aspect of the present disclosure.

Cluster Communication 402: The source cluster 326 and the destination cluster 328 communicate using connection 402. The connection 402 uses a network connection for transferring information between the cluster nodes.

Monarch Node: A node (e.g., 335A, FIG. 3C) on the destination cluster 328 that hosts a primary group control module 346B in a storage module (e.g., storage module 216, FIG. 2).

Owning Node: A node (e.g., 335A) on the destination cluster 328 that hosts the migrate Orchestrator 342.

Cluster Persistent Storage (CPS): A processor executable service that offers metadata volume (MDV) storage (e.g., 430A/430B) for use by cluster applications such as CRS 344.

Vserver Director Module (VDM): A component in the master CRS process that manages creation and flow of a Vserver stream. The Vserver DM (e.g., 408A/408B) is used to create and update source Vserver configuration (e.g., 426A) objects on the destination cluster 328.

Vserver Stream: A CRS construct that connects the source Vserver 320 of the source cluster 326 to the destination Vserver 324 at the destination cluster 328. Configuration baselines and updates made to the source Vserver 320 flow over the Vserver stream to the destination cluster 328.

Source Cutover Timer 412A: A timer at the source cluster 326 used by the cutover logic 345B to track the progress of a cutover workflow, as described below. If the timer 412A expires before the cutover workflow reaches a point of no return (PONR), the migrate operation is aborted on the source cluster 326. A similar destination cutover timer 412B is used in the destination cluster 328.

PONR: PONR is a stage within the cutover workflow, which is reached after all destination volumes 428B/430B (similar to 332A-332N of FIG. 3C) have been converted to read/write volumes and before starting the destination Vserver 324 LIF. PONR means that the source cluster 326 cannot start the source Vserver 320 from a source cluster node.

Migrate Orchestrator 342: This is a processor executable thread within a management module space (e.g., the management plane 336, FIG. 3C) to perform and manage various migrate operation related tasks in the background once a UI (User Interface)/REST endpoint 444 returns a confirmation to a client system to begin the migrate operation. This thread runs at a node (e.g., 335, FIG. 3C) of the destination cluster 328. This thread creates the destination Vserver 324 on the destination cluster 328 with the same Vserver name and Vserver identifier of the source Vserver 320.

CRS (344A/344B): The Vserver migrate operation uses the CRS 344A/344B for configuration information replication. CRS 344A/344B provides a framework to replicate configuration data 426A from the source cluster 326 to the destination cluster 328 (shown as 426B at the destination cluster 328). The Vserver migrate operation uses this module/service to replicate objects in a Vserver domain. When the destination cluster 328 receives the configuration information, each object/module can control how this object is created/modified on the destination cluster 328. For volume objects received by the destination cluster 328, the system auto-picks where the volume is created based on aggregate capability, headroom, and space availability on destination aggregates, as described below in detail. In the alternative, a client system has an option to provide a list of aggregates where the destination volumes should be created.

Config Agent 414A/414B: This module operates between the CRS 344A/344B and Vserver DM 408A/408B, respectively. A CRS stream is created by the Orchestrator 342 between the source cluster 326 and destination cluster 328 to replicate Vserver scoped objects and operations; and this module interacts with CRS 344 to setup metadata volumes 430B required for configuration replication, interacts with the source cluster 326 and destination cluster 328 to handle CRS configuration baseline replication, and also handles failures in configuration replication by retrying operations when necessary.

Polling Agent 410A/410B: This module provides a framework to create polling tasks to poll for an event or completion of a task for the migrate operation. Different components use this module to poll. e.g., every T second. This module iterates through a list of pending polling objects and polls for events/asynchronous tasks. The polling object is deleted when a corresponding event occurs, or a task is completed. For example, this module is used by the Config Agent 414A/414B to poll for completion of a baseline configuration information transfer and start a next step in the migrate operation.

Migrate RDB (Replicated Database) table (s) 432A/432B: The RDB tables 432A/432B maintain a list of Vserver migrate operations on both the source cluster 326 and destination cluster 328 and a state of the migrate operation, at any given time. The Vserver migrate operation uses "Group Synchronous" mirroring relationships and maintains RDB entries on both the source cluster 326 and destination cluster 328 to track the mirroring relationships. In one aspect, as a non-limiting example, SnapMirror (without derogation to any trademark rights) technology, provided by NetApp Inc, the assignee of this application is used to mirror information between source and destination cluster nodes. The adaptive aspects of the present disclosure are not limited to any specific mirroring technology.

Failure Module 406A/406B: This module rehosts migrate operation threads if a failure is detected during the migrate operation. This module is registered on both the source and destination clusters 326 and 328, respectively, for a callback when the cluster nodes go online or offline. If the owning node becomes unresponsive or the management module becomes unhealthy, the Orchestrator 342 is rehosted on another node. The owning node information, and a state of the migrate operation are tracked persistently in the migration RDB tables 432A/432B. This persistent information provides information to the failure module 406A/406B as to the recovery steps. For example, if the migrate operation is in the cutover phase, and if the node on which the cutover timer thread runs dies, the cutover timer thread is restarted on another node. When the failure module receives notification, it performs recovery operations based on a current state of the migrate operation, if the owning node becomes unresponsive.

Migrate Source Management Module 404: This module operates in the source cluster 326 and may be used for updating RDB table 432A entries, perform pre-checks, and execute post migration operations or execute abort operations.

Group Management Module 347A: This module interfaces/reuses the management module to manage group synchronous relationships. Following are some of the operations performed by this module: creates group synchronous relationship initialization when a migrate operation is started, creates a CG 331 representing the source Vserver (e.g., 320, FIG. 3C) with the Vserver volumes (e.g. 430A/428A or 330A/330N (FIG. 3C) and starts an appropriate "Group workflow" based on the migrate operation. Seed items and item-mapping to respective destination cluster storage module based on the source-to-destination volume mapping is executed by the Configuration Agent 414B.

Group Control Module 346A/346B: This module is executed in the storage module (i.e., the storage module) to perform group workflow for the migrate operation, as described below in detail.

Create and Auto Initialize Module (or API) 425A/425B: This module/API is used when migration is started or resumed by a client system. This module creates a CG synchronous relationship between the source cluster 326 and destination cluster 328 with a single CG 331 containing all the volumes in the Vserver 320; establishes the group relationships, starts a baseline transfer (auto-initialize), and back-to-back asynchronous transfer using the asynchronous engines 348A/348B. This module can be used even if the volumes at the destination cluster 328 are already partially initialized due to a prior paused/failed migrate operation. This module reuses already transferred data without requiring a re-transfer of all the data in the volume. This module can also be used if some of the volumes are already initialized, and some were added after a pause/failure. This module monitors back-to-back asynchronous transfers of each volume, and when all the volumes reach the "Ready for Cutover" criteria, it declares "Ready for Cutover" status to the Orchestrator.

Cutover Pre-Commit Module 422A/422B: This module may be part of the cut-over module 345A/345B and is used when the Orchestrator 342 has completed cutover pre-commit processing. The workflow executed by this module converts existing asynchronous mirroring relationships into synchronous relationships; waits for ongoing back-to-back transfer to complete, starts a last asynchronous transfer, and then transitions to an "INSYNC" state. In one aspect, each volume independently reaches the "INSYNC" state without coordinating with other nodes and other volumes in the CG 331. Once all the volumes reach the INSYNC state, the module declares a "Cutover Pre-Commit Complete" status to the Orchestrator 342. The Orchestrator 342 using the polling agent 410B periodically polls for this status update. The INSYNC state indicates that the volumes at the destination cluster 328 are synchronized with the volumes at the source cluster 326.

Cutover-Commit Module 424A/424B: This module may be part of the cut-over module 345A/345B and is used when the Orchestrator 342 has completed the cutover pre-commit phase, the cutover-source commit steps and calls to perform a cutover commit operation. The following steps are performed for each volume: drain and fence at the source cluster 326, which quiesces and drains any outstanding I/Os, transfer any metadata tracked outside the volume to the destination cluster 326, and convert all volumes to read/write volumes to make the volumes read-writable at the destination cluster 328. When the cutover-commit is completed, the Orchestrator 342 is notified. The progress of the commit phase can also be monitored through polling by the polling agent 410B.

Delete Module 420A/420B: This module is used to delete the mirroring relationships created on the destination cluster 328. This module is used when the migrate operation completes/pauses/fails or after a user initiated "abort" operation is complete. At the destination cluster 328, there are three options that can be used to control what snapshots are deleted, namely: RETAIN_ALL_SNAPSHOTS: If the pause or migrate operation failed, then this input is used to retain the snapshots created for the migrate operation. Retaining the snapshots enables resume of data copy from where the operation was stopped, when the migrate operation is resumed/restarted later. RETAIN_NO_SNAPSHOTS: This option is used to delete destination cluster 328 snapshots when the migrate operation completes. This deletes all snapshots created during the various phases of the migrate operation; and RETAIN_ONLY_FINAL_SNAPSHOT: This option is used to delete all the snapshots except a final snapshot. The final snapshot is retained to perform a data integrity check between the source cluster 326 and the destination cluster 328, as described below in detail.

Cleanup Module 418A/418B: This module is used to delete mirroring relationships created at the source cluster 326 from the destination cluster 328. This module is used when the migrate operation completes/pauses/fails, or a client-initiated abort operation is completed. At the source cluster 326, a "relationship-info-only" parameter controls whether snapshots created for the migrate operation are deleted during release. The relationship-info-only=true setting is used when the pause or migrate operation failed. Retaining the snapshots allows mirroring to resume data copy from where it was stopped when the migrate operation is resumed/restarted later and allows a previously INSYNC relationship to revert to INSYNC without re-initializing the destination volumes 428B/430B. When the relationship-info-only parameter is set to "false" then this option is used to delete snapshots at the source cluster 326 when the migrate operation is completed.

Abort Module 416A/416B: This module is used to pause an existing migrate operation. This aborts the ongoing transfer of the entire CG 331. The mirroring relationship could be initializing or performing back-to-back transfer. This module is not used if the migrate operation is already in the cutover phase (i.e., the pre-commit/commit/post-commit phase). Once the CG mirroring is aborted, this module provides a notification to the Orchestrator 342 for abort completion. Once the abort command completes successfully, the system can assume that transfers which were running will stop.

Synchronous Engine 349A-349B: This module is used to transfer information for CG 331 between the source cluster 326 and the destination cluster synchronously, after a baseline transfer has been completed, as disclosed below.

Asynchronous Engine 348A-348B: This module is used to transfer information for CG 331 between the source cluster 326 and the destination cluster asynchronously, during the baseline transfer has been completed, as disclosed below.

It is noteworthy that although the various modules of FIG. 4A are shown in separate blocks, these modules may be combined in any order and may be located or interface with each other in any order.

FIG. 4B shows another example of the architecture 400 and its various modules described above with respect to FIG. 4A. In FIG. 4B, the various modules at the source cluster 326 and the destination cluster 328 are split in the user space 440A/440B and kernel space 442A/442B, respectively. The source nodes 333A/33B interface with the destination nodes 335A/335B using connections 402A-402D. The various modules of FIG. 4B have been described above with respect to FIG. 4A and for brevity sake, are not described again.

FIGS. 5A-5F show process flow diagrams for the various phases/stages of a migrate operation to migrate the source Vserver 320, according to one aspect of the present disclosure. The following describes the various phases/stages of the migrate operation with respect to FIGS. 5A-5F using the various components described above with respect to FIGS. 4A-4B.

Figure 5A:
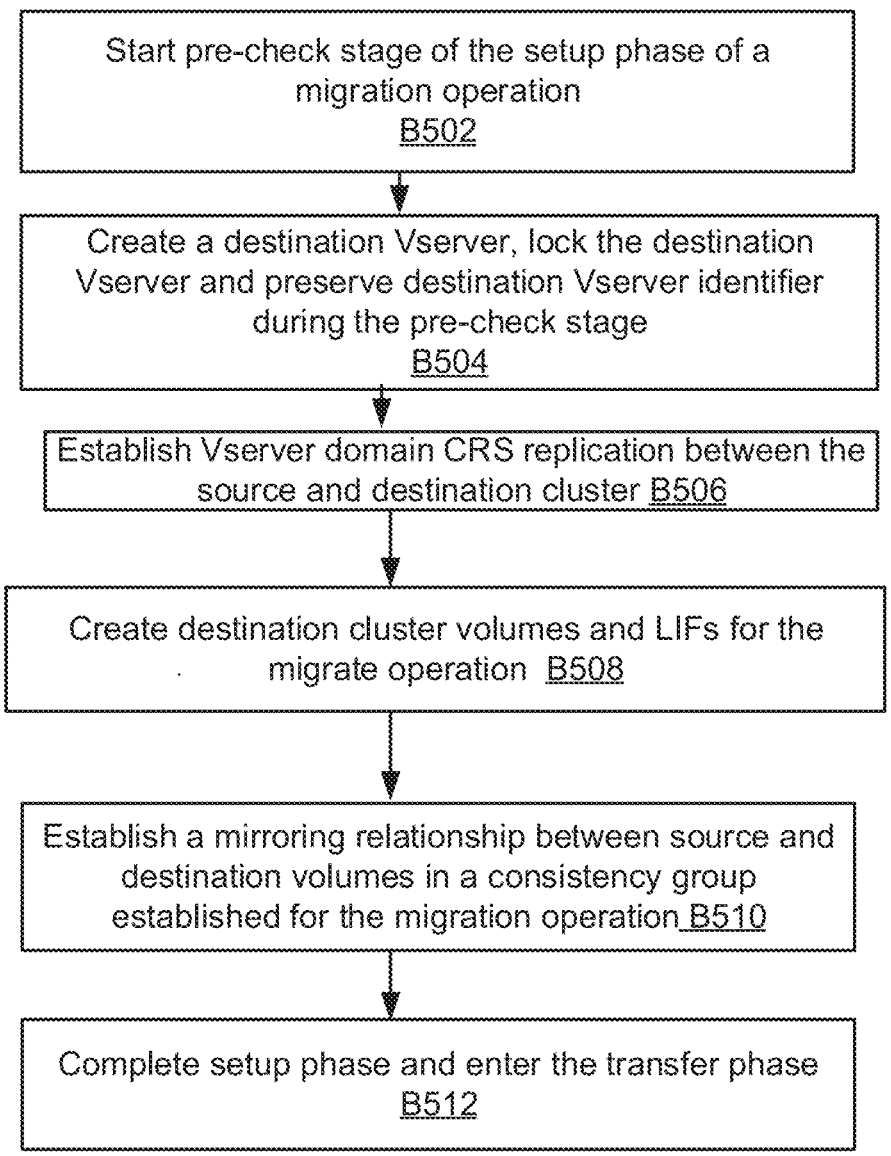
FIG. 5A shows a setup phase of a migrate operation to migrate the source Vserver to the destination cluster, according to one aspect of the present disclosure.

Setup Phase 500: FIG. 5A shows the setup phase process 500 of a migrate operation. In one aspect, the setup phase of the disclosed technology has various innovative features, including creating the CG 331 (FIG. 3C) with the source storage volumes (e.g., 330A-330N, FIG. 3C or 428A and 430A of FIGS. 4A/4B) belonging to the source Vserver 320 in the storage module. This enables group control close to a data transfer engine in the storage module, which allows for efficient interaction between the control plane 338 and a data transfer engine (e.g., 348 and/or 349, FIG. 3C) of the data plane 340. Separate master processes (e.g., 404 and 342, FIG. 4A) are executed in the source cluster 326 and destination cluster 328, respectively, to handle failure scenarios in the setup phase. Recovery is based on idempotent principle (implemented by all components). As described below in detail, different types of failure can be handled, including cluster failure, node failure, process failure, network port failure, and network partitioning. Volume and aggregate granular placement support volume to aggregate maps on the destination cluster 328. Volume placement during the setup phase is based on properties such as capacity, storage tiers (i.e. performance and/or capacity tiers) and others. LIF placement is executed to ensure affinity to volumes to avoid cross-node traffic after migrating. Source volume configuration is preserved at the destination cluster 326. In another aspect, a client system can specify the aggregates where the destination volumes can be placed. The client system can also specify which node or port LIFs at the destination cluster 326 are to be used for the destination Vserver 324, after migration.

In one aspect, the setup phase of the migrate operation involves updating RDB tables 432A/432B at both the source cluster 326 and destination cluster 328 nodes to track migrate operation processing. The Orchestrator 342 thread is created on a node in the destination cluster 328 to perform various operations, described below. The node on which the Orchestrator 342 is running is tracked persistently by the RDB table 432B using "owning node" information. This enables restarting the Orchestrator 342 on other nodes, if the owning node fails.

The setup phase further includes creating the destination Vserver 324 at a node of the destination cluster 328. The destination Vserver 324 and the source Vserver 320 that is being migrated have the same name and UUID (universal identifier). The destination Vserver ID is different than the source Vserver ID. The destination Vserver uses the same MSID (master set identifier) as used by the source Vserver 320 for the volume that will be created later by the Configuration Agent 414B. The MSID is a volume identifier that does not change. The destination Vserver 324 created at this stage is placed in a "stopped" state and is enabled after the migration operation, as described below in detail.

The setup phase further includes setting up CRS transfer streams to replicate configuration information from the source cluster to the destination cluster. This replicates the objects within a Vserver-domain. As part of the CRS replication, definition of different objects is called to create objects on the destination cluster 328. This creates volumes and LIFs on the destination cluster 328. Certain objects may need special handling when they are created on the destination cluster 328. For example, the source Vserver 320 may contain a volume that is a destination of a mirroring relationship (i.e., the source Vserver 320 receives information mirrored from another Vserver or any other entity). Because the migrate operation also uses mirroring technology, after CRS replication with no special handling, the volume will result in two mirroring sources (one Vserver migrate source, and another mirror source of the volume). To avoid such problems, CRS skips applying this configuration information until the migration operation is in the post-cutover phase. Once the volumes are created on the destination cluster, a group synchronous mirroring relationship is created with the CG 331 containing the source volumes 430A/428A in the source Vserver 320. This uses module 425B, described above. The mirroring relationship uses a new "Migrate" policy. This policy and its information are stored persistently and is available in the management module and the storage module of the source cluster 326. The "Migrate" policy may not include an "auto-cutover" bit because the auto-cutover functionality is managed by the Orchestrator 342.

Referring to FIG. 5A, process 500 begins in block B502, when a plurality of pre-check operations is executed at both the source cluster 326 and the destination cluster 328. The RDB tables 432A/432B are created. The orchestrator 342 is initialized on an owning node of the destination cluster 328. An entry is created in the RDB tables 432A/432B identifying the owning node, the orchestrator 342, the migrate operation (e.g., a job identifier) and a state value indicating the setup phase of migrate operation. The state control module 345A updates the initial state of the migrate operation.

In block B504, the orchestrator 342 creates the destination Vserver 324 with a same Vserver name and UUID as the source Vserver 320. The destination Vserver 324 identifier may be different from the Vserver 320 identifier. The orchestrator thread 342 configures the state of destination Vserver 324 as "stopped", which indicates that the destination Vserver 324 is not ready for use yet.

In block B506, a CRS stream is created by the configuration agent 414A to replicate the Vserver configuration data 426A at the destination cluster 328. Thereafter, in block B508, the destination storage volumes 428B/430B are selected and configured. In one aspect, storage volumes are selected based on properties such as capacity, fabric-pool, and others. In one aspect, the destination storage volumes 428B/430B are selected from a list of qualified aggregates. The list may be provided by a client system. In another aspect, the volumes are selected based on encryption requirements. In yet another aspect, destination volumes are selected based on available storage capacity, especially if the source volumes have a space guarantee. In another aspect, the destination volumes are selected based on performance criteria, e.g., latency, number of IOPS, available performance capacity or any other parameters, as described below in detail. The management system 132 (FIG. 1) collects storage volume performance data on a regular basis and this information is then used to select the destination volumes for the migrate operation.

Furthermore, in block B508, LIFs are created for the destination Vserver 324. LIF selection or placement is executed to ensure affinity to volumes to avoid cross-node traffic after migrating. In one aspect, a destination port from a given IP address space in the destination cluster 328 is selected based on level 2 (L2) connectivity with a source cluster port. The ports may be located at network adapters used in the source and destination clusters to communicate with each other. Both the destination and source ports are within a same subnet. This prevents any data outage, after the migrate operation is complete.

In block B510, after the destination volumes are created at the destination cluster 328, a group mirroring relationship is created by generating the CG 331 with all the source volumes that will be mirrored to the destination volumes as a group. This relationship is generated by module 425B. This information is stored as part of the "migrate" policy and stored in both the storage module and the management module. An "auto-cutover" bit is also established by the orchestrator 342, if desired by the user. The auto-cutover bit may be stored in a job object that is created by the orchestrator 342 to track the migrate operation or at any other location. Thereafter, in block B512, the process moves to the transfer phase 501, described below with respect to FIG. 5B.

Figure 5B:
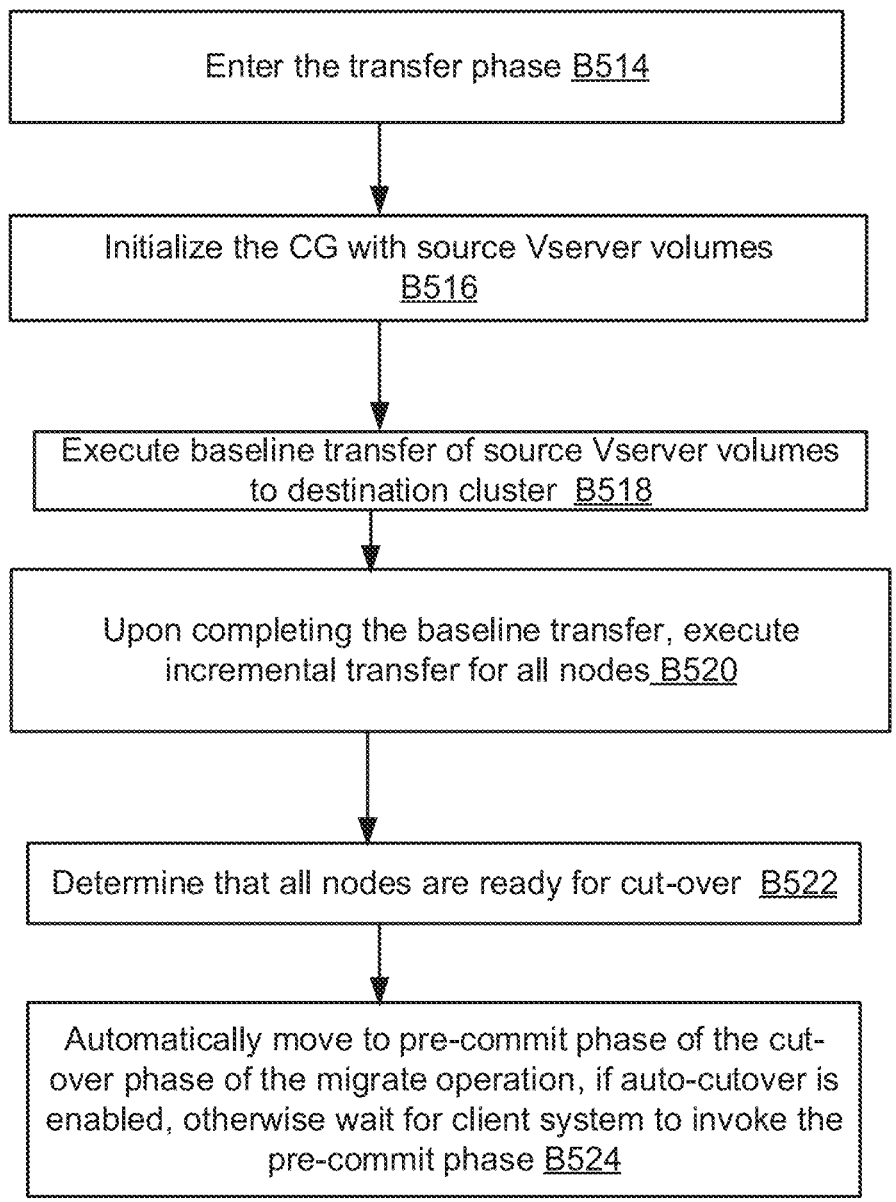
FIG. 5B shows a transfer phase of the migrate operation to migrate the source Vserver to the destination cluster, according to one aspect of the present disclosure.

Transfer Phase 501: The transfer phase 501 of the migrate operation, as shown in FIG. 5B is executed using the asynchronous engine 348A and synchronous engine 349A (FIG. 4A) using the group level mirroring relationships for the CG 331 created during the setup phase. The transfer phase 501 can be paused and then resumed, as described below in detail. The transfer phase 501 includes reusing the RDB tables 432A/432B to track group level mirroring relationships created with a migrate policy. The transfer phase performs an initial baseline transfer of the source volumes 428A/430A to the destination volumes 428B/430B managed by different nodes (e.g., 333A/333B, FIG. 4B) of the source cluster 326. Each node's group control module 346A coordinates completion of the baseline transfer of the volumes hosted on that node. A master group control module at a master node coordinates cross-node baseline transfer completions. When the baseline transfers are in-progress, the source volumes 428A/430A continue to accept incoming I/Os that result in new changes. To keep the destination volumes 428B/430B closely synchronized with the source volumes, a new incremental snapshot of source volumes is taken to replicate any incremental changes, as described below. This is executed continuously so that data on the destination volumes 428B/430B is close to the data on the source volumes 428A/430A. This is referred to as "back-to-back transfers". In addition to data replication, the snapshots of the volumes are also replicated to the destination cluster. This includes user-created, system-created scheduled snapshots, snapshots created for other use cases such as Asynchronous/Synchronous/cloud backup mirroring relationships, described below in detail.

Also, during the transfer phase, new snapshot creations are allowed, and any newly created snapshots are also replicated to the destination cluster 328. This is controlled by having a "mirror all snapshots" rule within the migrate policy. If the mirroring relationship is using the migrate policy, each volume reaches "Ready for Cutover" criteria when the last few (e.g., 3) back-to-back transfers are complete within a certain duration, e.g., 5 minutes. When all the nodes/volumes reach "Ready for Cutover" criteria, the master group control module declares the CG 331 as "Ready for Cutover". The Orchestrator 342 uses the polling agent 410B to check on the progress and status of this phase.

Even after declaring "Ready for Cutover", the group control module 346A continues to perform back-to-back transfers including transferring user created or scheduled snapshots so that the destination volumes keep up with the changes at the source volumes. It is possible that after declaring "Ready for Cutover", additional snapshots created on the source cluster before the Orchestrator 342 disables source snapshot creation may need to be transferred. These snapshots are transferred either as the back-to-back phase continues waiting for the cutover input from the Orchestrator 342 or are transferred during the "cutover-pre-commit" phase that is described below.

Furthermore, during the transfer phase, CRS replication from the source cluster 326 to the destination cluster 328 continues, and the Orchestrator 342 continues to poll the status of the "Create+Auto Initialize" operation. If this operation fails, for a re-try able error, the Orchestrator 342 retries the "Create+Auto Initialize" operation. The "Create+Auto Initialize" is an idempotent operation and the Orchestrator 342 can continue calling this API (425B, FIG. 4A) without performing any cleanup or undo steps.

At this stage of the transfer process, the migrate operation is ready for a cutover phase. If an auto-cutover option is off, then the process waits for a user input to invoke the cutover phase. If the auto-cutover is on, the migrate operation state goes from "Transfer" to "Cutover phase." As an example, the auto-cutover may be enabled as a default setting. It is noteworthy that while waiting to start the cutover phase, the back-to-back transfer workflow continues. The Orchestrator 342 continues to poll on the operation UUID created for the "Create+Auto Initialize" operation to monitor the progress or status of the background transfers. If the operation fails and it is not fatal, the Orchestrator 342 retries by retrying the "Create+Auto initialize operation.

Referring now to FIG. 5B, the transfer phase entry begins in block B514. In block B516, the source volumes 428A/

430A are initialized based on the migrate policy that was created by module 425B for the migrate operation during the setup phase.

In block B518, a baseline transfer of the source volumes 428A/430B for each node (e.g., 333A and 333B, FIG. 4B) is executed. In one aspect, to execute the baseline transfer, a snapshot (i.e., a point in time copy) of the source volumes 428A/430A is taken and transferred to the destination nodes (e.g., 335A/335B, FIG. 4B). The baseline transfer may be executed using the asynchronous engine 348A. Once the baseline transfer is completed for all source nodes, the process executes incremental transfer at the source volumes, since baseline transfer. This may be executed by taking an incremental snapshot of the source volumes. Thereafter, in block B522, the process determines if all the volumes are "ready for cut-over". In one aspect, this is based on completing the baseline and incremental transfer. Once the "ready for cut-over" stage is reached, the migrate operation moves to a pre-commit phase of the cut-over phase. If the auto-cutover option is enabled, then the migrate operation automatically moves to the pre-commit phase in block B524, otherwise, a user input is used to move the pre-commit phase. It is noteworthy that the system continues to allow taking snapshots of the source volumes during the transfer phase, even after the baseline transfer and incremental transfer. These snapshots are transferred during the pre-commit phase, when the source Vserver access is disabled, as described below.

Figure 5C:
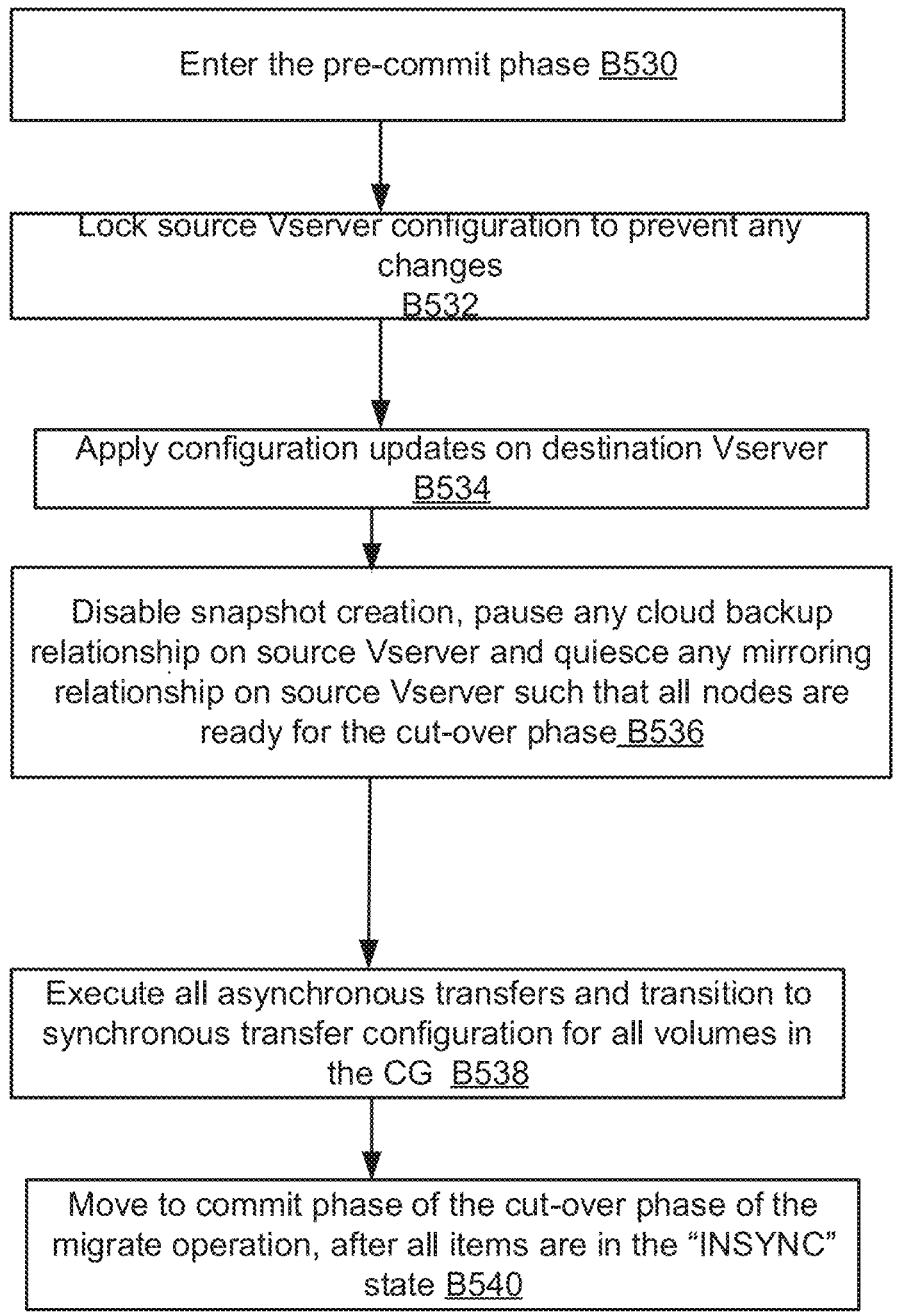
FIG. 5C shows a pre-commit stage of a cut-over phase of the migrate operation to migrate the source Vserver to the destination cluster, according to one aspect of the present disclosure.

Cutover phase: In one aspect, the cutover phase may be user initiated or initiated automatically when the auto-cutover option is enabled. The auto-cutover can be enabled or disabled by setting a bit value associated with the source Vserver 320, a user or any other system. The auto-cutover setting is available to the Orchestrator thread 342 to initiate the cut-over phase. In one aspect, the Orchestrator 342 starts the cutover phase, which has multiple stages, e.g., a pre-commit stage to prepare the source cluster 326 and the destination cluster 328 to enter an "outage window"; a commit stage when the outage window occurs with no user system data access; a source commit stage that prevents access to data from the source cluster 326 in preparation to transfer control over to a destination node in the destination cluster 328; a destination commit stage to restore access to the migrated Vserver 324 from the destination cluster 328; and a post-commit stage when access is restored via the destination cluster 328. The following provides a description of the various stages of the cutover phase:

Pre-commit stage 503: FIG. 5C shows a process flow 503 for the pre-commit stage/phase of the cut-over phase for migrating the source Vserver 320 to the destination cluster 328 as Vserver 324. The pre-commit stage transfers the mirroring relationships to the synchronous engine 349B to ensure a short cutover window. The term cutover window means a duration during which the cut-over phase needs to be completed for the migrate operation to succeed. The pre-commit stage begins with starting a "Pre-Commit Timer," shown as the source timer 412A (FIG. 4A) on the source cluster 326. The source timer 412A is set to X minutes, e.g., 120 minutes, within which this stage has to be completed. The source timer 412A detects cases where the pre-commit stage fails or is likely to fail and hence can't progress to the next, commit stage.

The source timer 412A is disabled when the process moves to the commit stage, back to the transfer phase due to errors or if the migrate operation fails. When the source timer 412A expires, the migrate operation is failed, and the pre-commit steps are undone. The migrate operation state is updated to indicate a "Migrate failed" state. During pre-commit, the source Vserver 320 configuration is locked i.e., no changes can be made after the lock is in place. The process waits for pending configuration replication to complete and for the configuration changes to apply on the destination cluster 328. If the source Vserver 320 contains volumes that are mirroring destinations, then the configuration update for those volumes is postponed till the post cutover stage, described below.

The Orchestrator 342 co-ordinates the various calls for the pre-commit stage. These calls can be used to perform various pre-commit stage tasks, e.g., if a mirroring subsystem chooses not to replicate snapshots when it transitions to the synchronous engine 349A, it can perform steps to disallow snapshot creation at this stage; for mirroring to the cloud layer 136, it can choose to quiesce and abort transfers to the cloud layer 136; and if the source Vserver 320 is the destination of another mirroring relationship, quiesce and abort the relationship from its source Vserver.

Once the various subsystems have completed pre-commit tasks, the group control module 346B is called to transfer from the asynchronous engine 348A to the synchronous engine 349A. This group control workflow includes stopping and waiting for completion of a previous mirroring workflow which was performing back-to-back transfers; starting a new group workflow to perform the following operations independently across volumes and nodes: wait for ongoing snapshot transfers to complete; perform any additional back-to-back transfers if the destination volume hasn't converged to the source volume; perform a last asynchronous transfer; and transition from an asynchronous to a synchronous state and wait for the volume to reach an "INSYNC" state. Once all the destination cluster nodes (e.g., 335A/335B, FIG. 4B) reach the "INSYNC" state, declare to the Orchestrator 342 that the pre-commit stage is complete. All NFS delegations are revoked to prepare for the commit stage of the cut-over phase, as described below in detail.

Referring now to FIG. 5C, the pre-commit stage is entered in block B530, after the transfer phase of the migrate operation is successfully completed. In block B532, the orchestrator thread 342 locks the source Vserver 320 configuration to prevent any changes. In block B534, any configuration updates that are pending at the source cluster 326 are applied to the destination Vserver 324. In block B536, non-migrate operation related snapshot creation is disabled at the source Vserver 320, any mirroring relationships that mirror source volumes to the cloud layer 136 are paused and any other mirroring relationships where the source Server 320 volumes are the destination or source for a mirroring operations are paused. This ensures that the configuration and data is not likely to change at the source cluster 326. Thereafter, in block B538, all asynchronous transfers of source Vserver 320 snapshots to the destination cluster 328 are completed. The transfer process is then moved to the synchronous engine 349A that synchronously transfers information for the plurality of nodes 333A/33B at the source cluster 326. The process determines if all the source volumes are ready for cut-over within a cut-over duration. If yes, then the status of all the volumes is updated to "INSYNC" in block B540. This information is stored at RDB tables 432A/432B. If the volumes are not ready for the commit phase, the pre-commit stage is failed. If successful, the migrate operation moves the commit state that is described below in detail with respect to FIG. 5D.

Figure 5D:
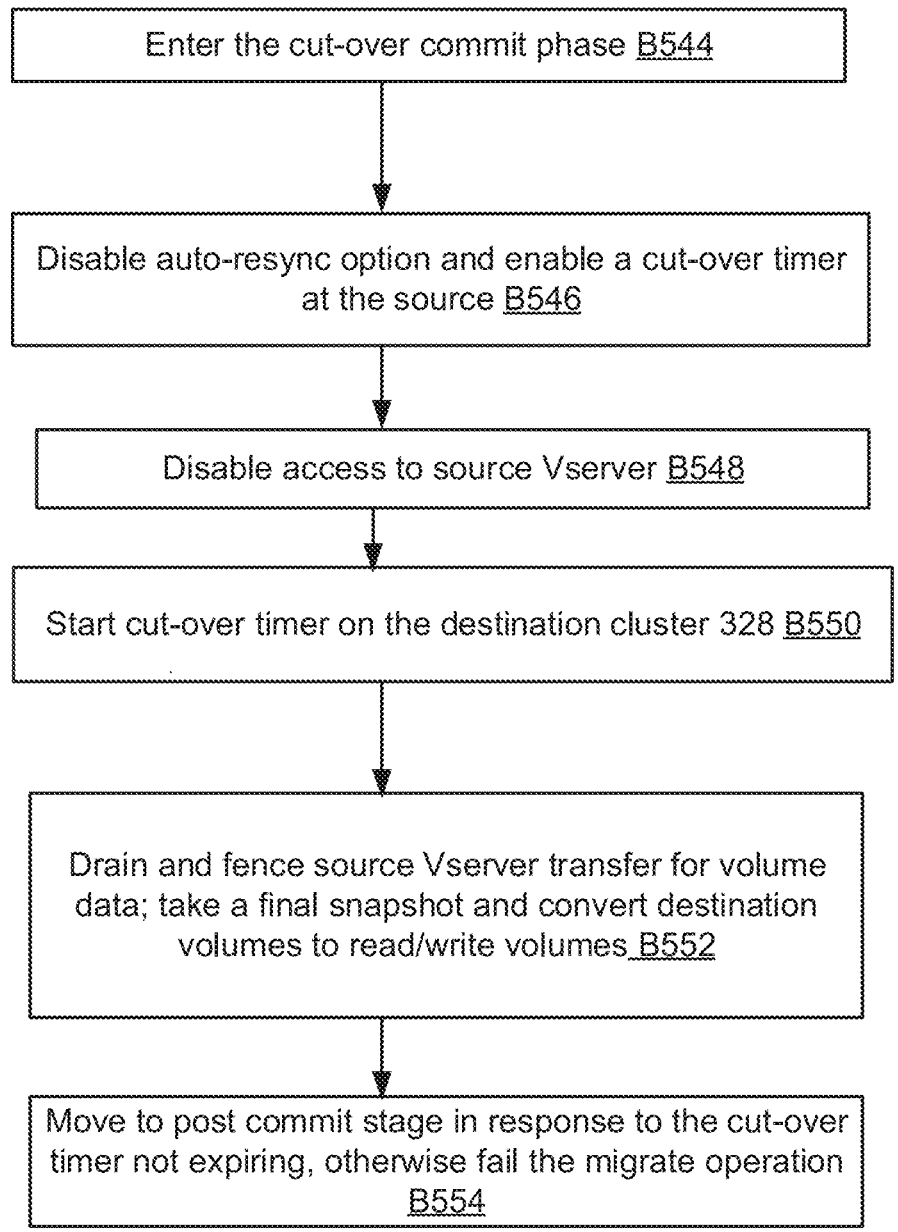
FIG. 5D shows a commit stage of the cut-over phase of the migrate operation to migrate the source Vserver to the destination cluster, according to one aspect of the present disclosure.

Cutover commit stage 505: FIG. 5D shows a process 503 for the cutover commit stage that is intended to complete this stage within a "total outage window" i.e., a duration when client system I/Os are delayed for processing. A persistent state for the commit stage is maintained at both the clusters 326 and 328, e.g., at the RDB tables 432A/432B. The commit stage begins in block B544, after a successful pre-commit stage, described above with respect to FIG. 5C.

In block B546, an auto-resync feature is disabled. This stops execution of any mirroring relationships associated with the source volumes. The source timer 412A is started in the source cluster 320 owning node and then in block B548, access to the source Vserver 320 is stopped. The migrate operation is failed if the source timer 412A expires and the source Vserver 320 is restarted to process I/O requests.

In block B550, the destination cut-over timer 412B is started. In block B552, the group control module 346B is started to control the workflow of a commit stage idempotent operation. The workflow includes the following: drain and fence any I/O on the source cluster 326; replicate any content stored outside the source volumes to the destination cluster; take a final snapshot of the source volumes, prior to allowing new I/Os to be processed from the destination cluster 328, which enables data integrity checks between the source cluster 326 and the destination cluster 328; and convert the destination volumes from a read-only configuration to read/write volumes to allow reads and writes from the destination cluster 328. It is noteworthy that the destination Vserver 324 is not yet operational, therefore, client generated I/Os are still not processed from the destination cluster 328. At this point, if a failure occurs, the source Vserver 320 can be restarted. If the migrate operation doesn't transition to a next stage, i.e., the PONR (Point of No Return) stage within a certain duration, the destination timer 412B expires and the source Vserver 320 is restarted on the source cluster 326.

Once the cutover commit stage is completed in block B554, the Orchestrator 342 is notified. To handle any missed notification, the cutover completion status is also polled by the Orchestrator 342. For any errors that can be retried, the Orchestrator 342 can restart the migration from the beginning of the transfer phase. If the commit stage fails, the source Vserver 320 is restarted and the source cutover timer 412A is disabled. The migrate operation can then be restarted from the transfer phase. The destination volumes 428B are reconverted to DP (i.e., read-only) volumes, if they were converted to read/write configuration during the commit stage.

Figure 5E:
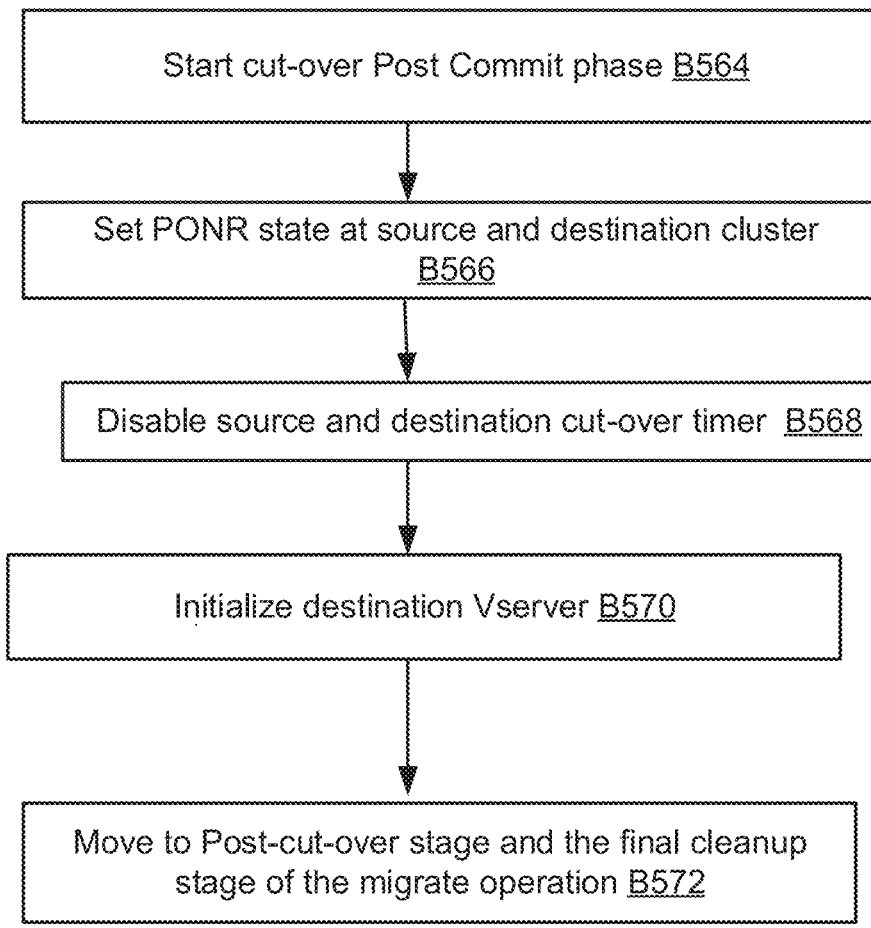
FIG. 5E shows a post commit phase of the migrate operation to migrate the source Vserver to the destination cluster, according to one aspect of the present disclosure.

Post Commit stage 507: FIG. 5E shows the post commit stage 507 that begins in block B564, according to one aspect of the present disclosure. During the post commit stage 507, in block B566, the migrate operation state is updated to the PONR state on the source and destination cluster RDBs 432A/432B, respectively, to prevent the source cluster 326 starting the source Vserver 320 again. In block B568, the source cutover commit timer 412A and the destination timer 412B are cancelled. In block B570, the destination Vserver 324 is started on a destination cluster node (e.g., 335A or 335B, FIG. 4B). Thereafter, in block B572, the migrate operation moves to a post cut-over phase and then a final clean-up stage that are both described below in detail with respect to FIG. 5F.

Figure 5F:
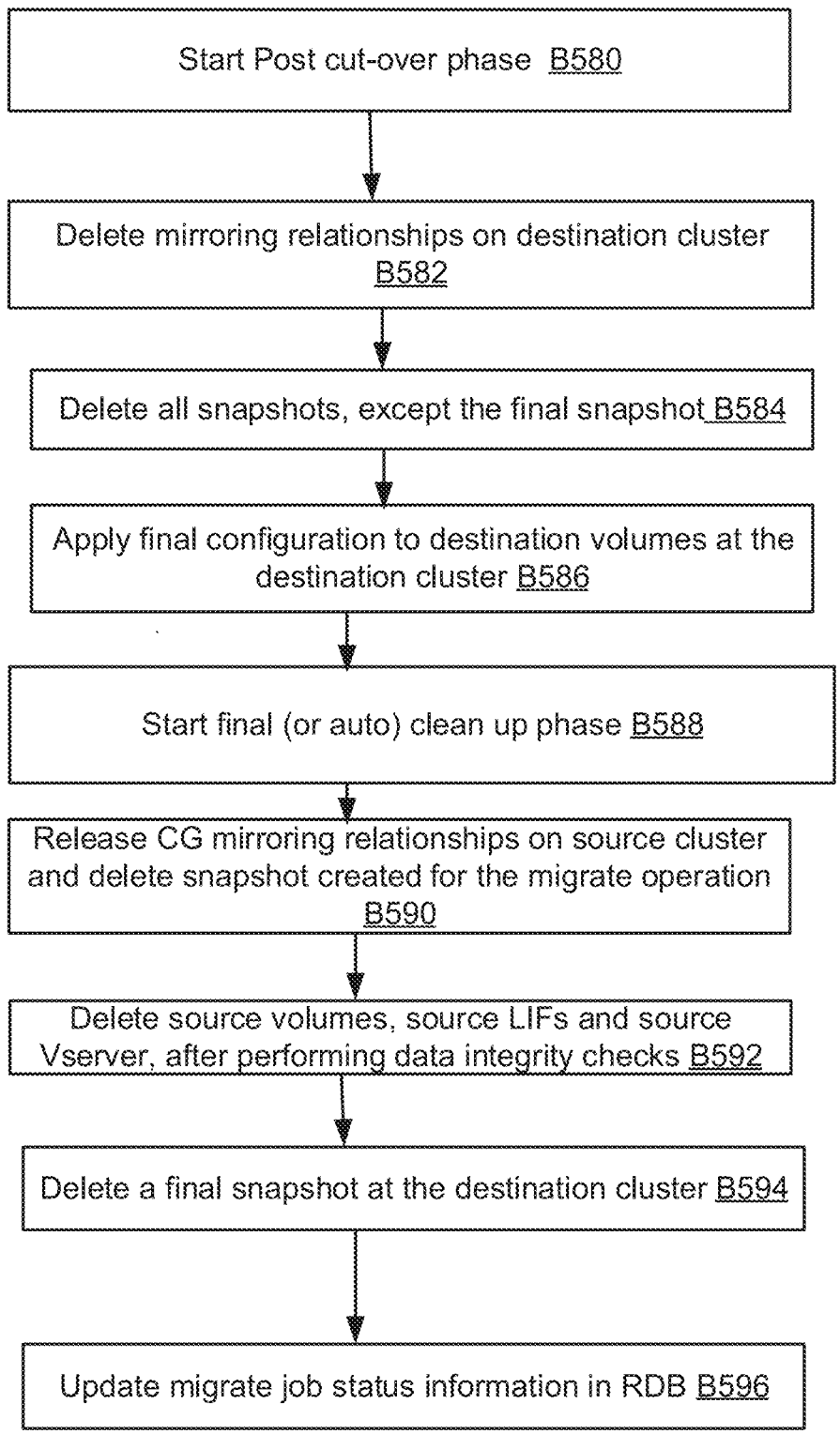
FIG. 5F shows a post cut-over phase and a final clean up phase of the migrate operation to migrate the source Vserver to the destination cluster, according to one aspect of the present disclosure.

Post Cutover phase and Final Cleanup phase 509: FIG. 5F shows the process 509 for the post cut-over phase and the final cleanup phase of the migrate operation, according to one aspect of the present disclosure. Although both phases are shown within FIG. 5F, the final cleanup phase occurs after completion of the post cut-over phase that begins in block B580. In block B582, all mirroring relationships are first deleted on destination cluster 328. Thereafter, in block B584, the snapshots created for the migrate operation on the destination cluster 328 are deleted, except for the final snapshot. In block B586, the final configuration retrieved from the source Vserver 320 are applied to the destination Vserver 324. If there is an error during post cutover, the Orchestrator 342 retries to fix the error. If the source Vserver 320 contained any volumes that were configured as destination volumes for a mirroring relationship, then the mirroring objects that were not applied on the destination cluster 328 in the earlier phases of the migrate operation are applied. Thereafter, the final cleanup phase is started in block B588.

In one aspect, the final cleanup is controlled by an "auto-source-cleanup" setting in the migrate policy. If the "auto-source-cleanup" option is not set, the process stays in this phase till the client system invokes a "source-cleanup" operation. Once the client system invokes the "source-cleanup" operation or if auto-source-cleanup option is set, the operation moves to a final cleanup phase in block B588. Thereafter, in block B590, all mirroring relationships of the source volumes at the source cluster 320 are deleted from RDBs 432A/432B. All snapshots taken of the source Vserver 320 are deleted.

In block B592, data integrity checks are performed to ensure that the final snapshot of the destination Vserver 324 is the same as the source Server 320. The enables the source Vserver 320 to be brought back online if there is a failure. Thereafter, the source volumes 428A/430A, the LIFs associated with the source Vserver 320, any other objects created for or by the source Vserver 320 and the source Vserver 320 are deleted. In block B594, the final snapshot of the destination volumes 428B/430B is also deleted. The status of the migrate operation is then updated in block B596.

Figure 6:
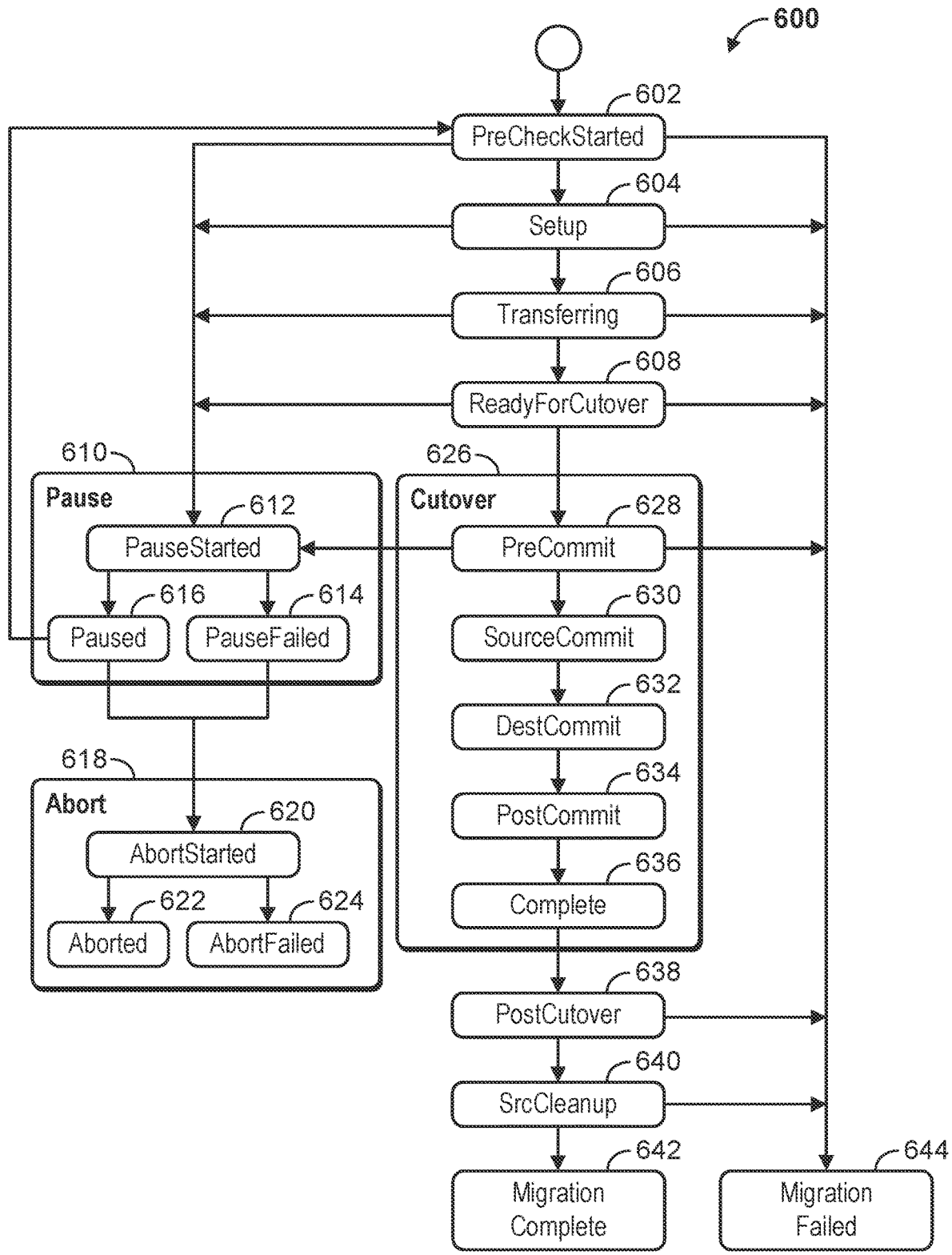
FIG. 6 shows a state diagram for the migrate operation to migrate the source Vserver to the destination cluster, according to one aspect of the present disclosure.

State Diagram 600: FIG. 6 shows a state diagram 600 for tracking the various phases of the migrate operation described above in detail. The migration operation states are tracked by a state control logic 345A (FIG. 4A) or by any other module. As mentioned above, the migration operation states are persistently stored at both the source cluster 326 and the destination cluster 328, so that if the migrate operation is paused, failed or aborted, appropriate action can be taken.

The migration operation begins with a pre-check state 602, and after the pre-check, the setup phase state 604 is reached, described above with respect to FIG. 5A. Once setup phase is complete, the transfer state 606 is reached, described above with respect to FIG. 5B. After the transfer phase is completed, the migrate operation transitions to a "ready for cut-over" state 608, also described above with respect to FIG. 5B. When all the source volumes are ready for cut-over, the migrate operation transitions to the cut-over phase 626. Within this phase there are multiple stages/states, namely the pre-commit state 628 described above with respect to FIG. 5C, the source commit state 630 and the destination commit state 632, described above with respect to FIG. 5D. After the destination commit state, the migrate operation transitions to the post commit state 634. State 636 indicates the completion of the post commit state described above with respect to FIG. 5E. The migrate operation then moves to the post-cutover state 638 and the source (or final cleanup state) 640, both described above with respect to FIG. 5F. State 642 indicates successful completion of the migrate operation, while state 644 indicates a failure. The migrate operation failure is described below with respect to FIGS. 7E and 7F.

The state diagram 600 also shows the pause state 610 that indicates the migrate operation has been paused. The start of the pause stage is indicated by state 612, while a successful pause operation is shown by state 616. If the pause attempt fails, then it is shown by state 614. Details of the pause process are provided below with respect to FIG. 7A.

In one aspect, the migrate operation can be aborted, as shown by state 618. The abort state can be reached from the pause states 616, pause failed state 614 or other failed states. It is noteworthy that the abort state can be reached from other states as well, e.g., the abort state may be reached before reaching the cut-over stage. State 620 indicates that the abort process has started, while state 622 indicates a successful abort operation. If an abort attempt fails, it is indicated by state 624.

Figure 7A:
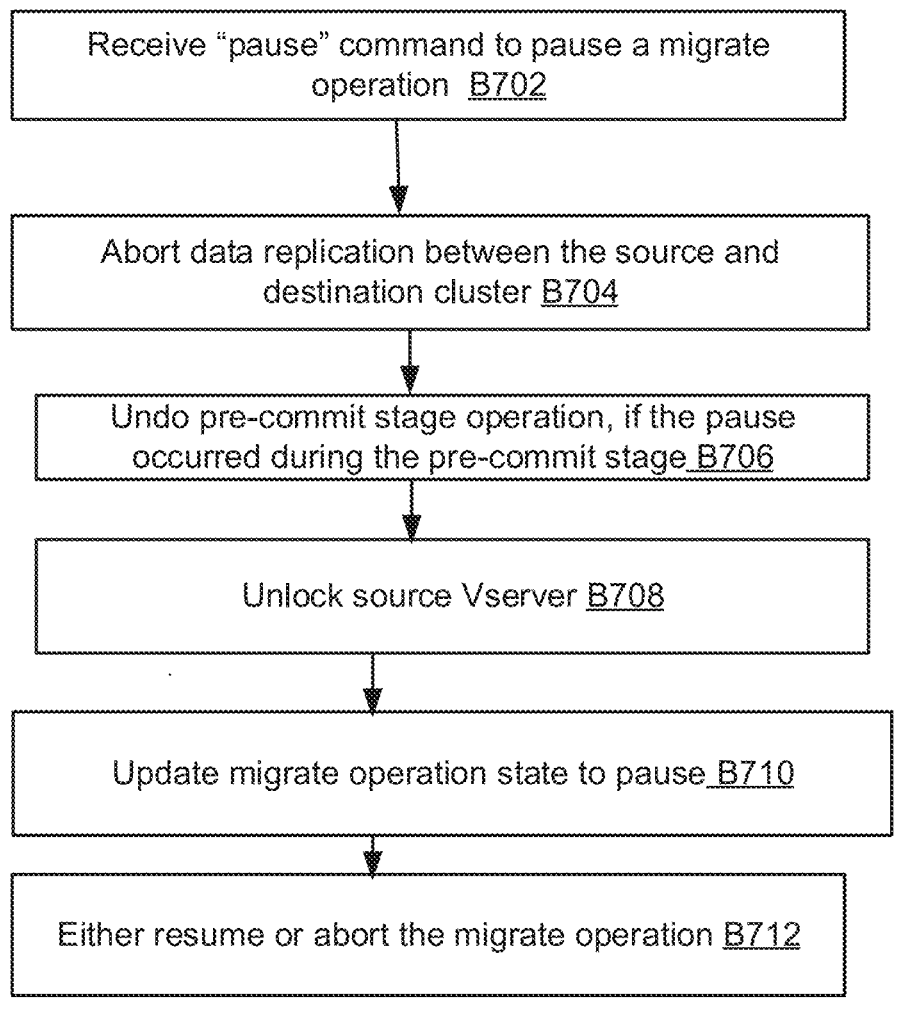
FIG. 7A shows a pause phase of the migrate operation to migrate the source Vserver to the destination cluster, according to one aspect of the present disclosure.

Migrate Pause Operation 700: FIG. 7A shows the migration pause operation 700, according to one aspect of the present disclosure. Depending upon the size of the source Vserver 320 that is migrated, the migrate operation may be a long operation. The technology disclosed herein allows a client system to pause the migrate operation for one or more reasons, e.g., to perform operations that were not allowed while the migration is in progress and reduce network usage or any other reason. The migrate pause option is before the cutover commit stage described above. When the migration operation enters a "pausing state," (612, FIG. 6) data replication and configuration information replication between the source cluster 326 and the destination cluster 328 is paused. However, objects created on the destination cluster 328 such as volumes, snapshots, LIFs and others are left intact. The destination Vserver 324 on the destination owning node (e.g., 335A) remains locked, and no modification to the destination Vserver 324 is permitted. The source Vserver 320 is unlocked for example, to enable volume deletion/addition/move, LIF changes and other operations. The mirroring relationships between the source cluster 326 and destination cluster 328 are deleted. It is noteworthy that the Orchestrator 342 and other migrate operation threads check for a pending pause request, prior to starting any extensive operation or when the Orchestrator 342 is restarted.

In one aspect, to pause the migration operation, a command is received in block B702. The RDB tables 432A/432B are updated to indicate a pending migrate pause status. During this state, no other migrate operation is allowed on the source Vserver 320. In block B704, during this state, any data replication between the source cluster 326 and destination cluster 328 is aborted. If the CG 331 is still performing initialization (i.e., a baseline transfer, as described above), it terminates the ongoing initialized workflow. To stop configuration replication, a state of the Vserver CRS stream is set to "down" on both the source cluster 326 and the destination cluster 328.

If the migrate state is in the cutover pre-commit stage, then in block B706, the steps already performed during the pre-commit stage are undone. The progress of undoing the steps from this stage are tracked persistently so that if the Orchestrator 342 or any other thread become unresponsive, the pause operation could still be idempotent. If the source Vserver 320 contains mirroring destinations, the mirroring relationship is resumed and the source Vserver 320 is unlocked in block B708. The CG 331 mirroring relationships are removed, and any snapshots taken prior to the pausing state are preserved. Thereafter, in block B710, the migrate operation state is then moved to a "Paused" state (616, FIG. 6). During the "Paused" state, only "Resume" or "Abort" operations can be performed.

A previously paused migrate operation is resumed using a "Vserver migrate resume" operation. The resume operation is in effect the idempotent version of the "Vserver migrate start" operation. It performs all the operations performed for the source Vserver 320 to restart the migration. One difference between a new Vserver migrate operation vis-A-vis a Vserver resume operation is that some or all the required objects on the destination cluster 328 may already be present, hence the objects at the destination cluster are reconciled with the source cluster 326 by the CRS 344B. For the resume operation, the migrate operation will restart from the setup phase, but it will not result in recopying the entire data and configuration information, instead only an incremental copy operation is used that replicates changed information. This saves time and is hence more efficient.

Cloud Backup Process 726: The source Vserver 320 may have one or more volumes (e.g., 428A/430A) that may have a cloud backup relationship. This means that the snapshot of the volumes are backed up to a data store in the cloud layer 136.

Figure 7B:
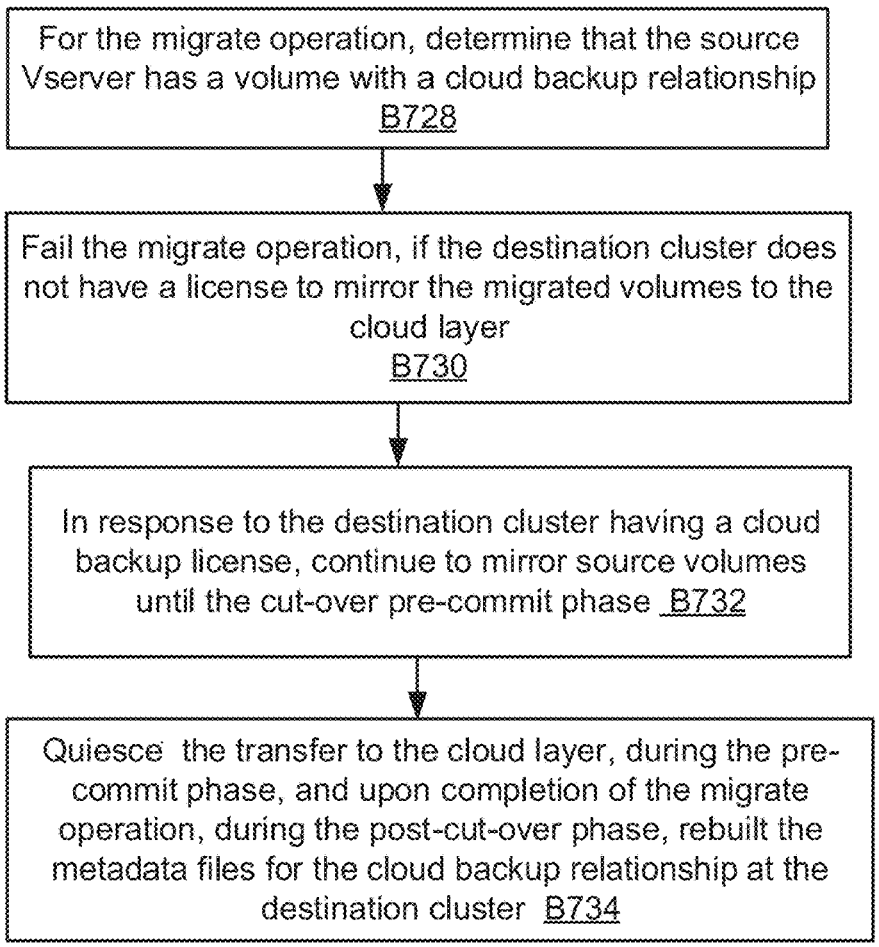
FIG. 7B shows a process for handling cloud backup during the migrate operation to migrate the source Vserver to the destination cluster, according to one aspect of the present disclosure.

FIG. 7B shows a process 726 for handling the cloud backup relationships during a migrate operation as described above. In block B728, the process first determines that one of source volumes 428A/430B has a cloud backup relationship. This information is obtained from volume configuration data that is accessible to the Orchestrator 342. In block B730, the migrate operation checks if the successful of the migrate operation will result in a capacity-based license violation and whether the destination cluster 328 has network access to the cloud layer 136. This information is stored as cluster configuration data and available to the Orchestrator 342. In block B730, the migration is failed, if the destination cluster 328 does not have a license to mirror the volumes migrated from the source cluster 326 to the cloud layer 136.

If the destination cluster 326 has the appropriate license, then in block B732, the data transfer to the cloud object storage continues during the migration operation till the source Vserver 320 reaches the cutover pre-commit phase. It is noteworthy that cloud storage uses different data format on a cloud object store compared to the storage system 120. For example, L0 (level 0) volume blocks that store data are packed together in a single cloud block. The mapping between a virtual volume block number (VVBN) to the cloud back number (CBN) are tracked in a metafile "vmap metafile".

In block B734, transfer to the cloud layer 136 is paused using a "quiesce" operation on the cloud backup relationship. The cloud backup specific metafiles are rebuilt on the destination cluster 328 and no metafile is replicated to the destination cluster 328. In the post cutover phase, new mapping between VVBN to cloud block number is constructed.

Figure 7C:
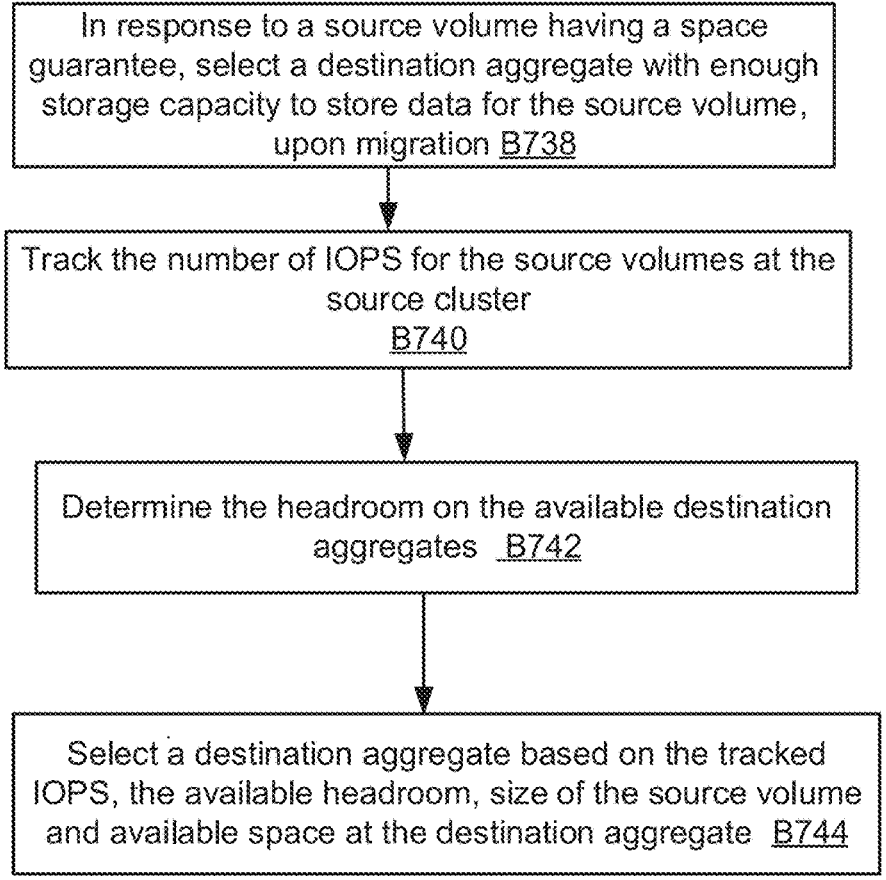
FIG. 7C shows a process for volume placement of the migrate operation to migrate the source Vserver to the destination cluster, according to one aspect of the present disclosure.

Volume Placement (736): FIG. 7C shows a process 736 for volume placement, according to one aspect of the present disclosure. The volume placement occurs during the setup phase of the migrate operation, described above with respect to FIG. 5A. In one aspect, the volume placement at the destination cluster 328 is based on a list of qualified aggregates. If a source volume (428A/430A) is configured with a space guarantee, then only a destination aggregate with enough storage room is used. The destination aggregate is picked from a list of qualified aggregate based on: tracking the number of IOPS for the source volumes 428A/430A processed by the source Vserver 320 at the source cluster 326 (block B746). This information is managed by the management module 134 that retrieves IOPS data for each volume from the storage system 120 and if applicable, the cloud layer 136.

The available headroom on the destination aggregates is determined in block B742. This is based on tracking, by the management module 134, the latency and a maximum number of IOPS (and/or utilization) processed by the destination aggregates. In this context, latency means a delay in processing an I/O request and may be measured using different metrics for example, a response time. Headroom in this context means available performance capacity of a destination aggregate at any given time. Headroom can be based on a relationship between latency and a maximum number of IOPS (or utilization) that can be processed by each destination aggregate. At a high level, the available headroom at any given time can be defined by the following relationship:

$$\text{Headroom} = \frac{\text{Optimal Point} - \text{Operational Point}}{\text{Optimal Point}}$$

A latency v. IOPS curve is generated, where latency is plotted on the Y-axis and maximum IOPS (or utilization) is plotted on the X-axis. An optimal point, after which latency shows a rapid increase represents maximum (or optimum) utilization of a resource beyond which an increase in workload is associated with higher throughput gains than latency increase. Beyond the optimal point, if the workload increases at the destination aggregate, the throughput gains or utilization increase is smaller than the increase in latency. An operational point shows a current throughput of a destination aggregate.

In block B744, the destination aggregate is selected based on the tracked IOPS, available headroom, size of the source volume and the available space on the destination aggregate. If the source volume is thin-provisioned, then the size of the source volume could larger than the actual space used by the volume. In that case, the actual space used is considered for volume placement, instead of the presented volume size. The volume placement operation will use the logical volume size plus extra space required for any space efficiency violation when it looks for a destination aggregate.

Figure 7D:
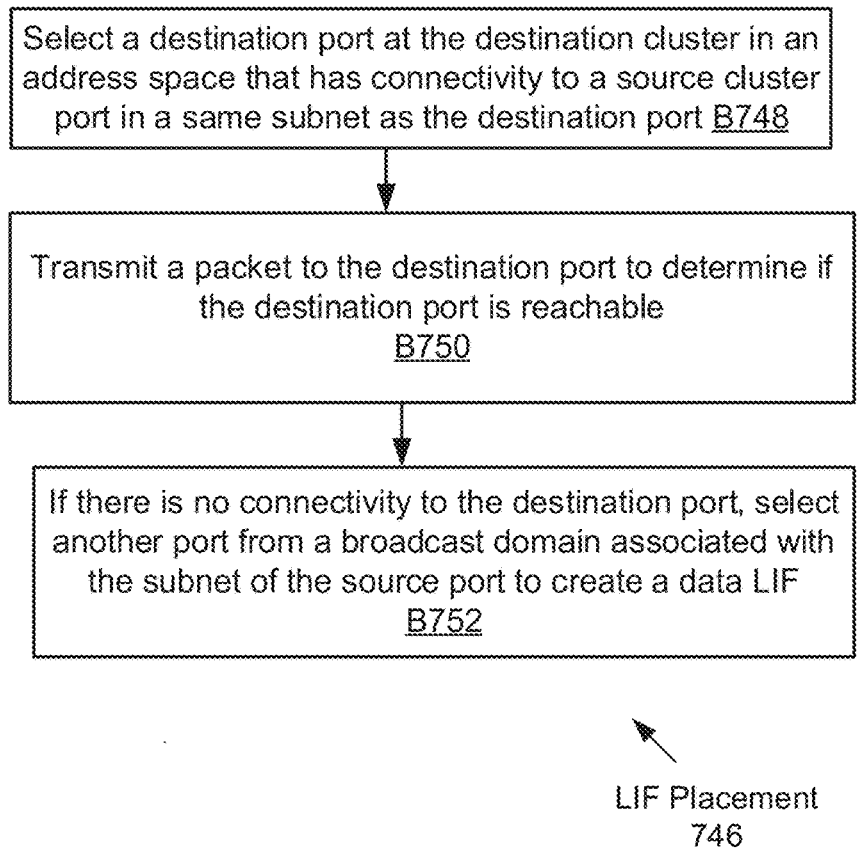
FIG. 7D shows logical interface ("LIF") placement for the migrate operation to migrate the source Vserver to the destination cluster, according to one aspect of the present disclosure.

LIF Placement 746: As part of the CRS replication, the data LIFs on the source Vserver 320 are replicated to the destination cluster 328. FIG. 7D shows the process for creating LIFs on the destination cluster 328, according to one aspect of the present disclosure. In block B748, one of the ports (e.g., a port at the network adapter 310, FIG. 3A) on the destination cluster 328 in each IP address space that has L2 (Level or Layer 2) connectivity to a source cluster port in the same subnet as the destination data LIF port is selected. L2 in this context is a broadcast Media Access Control (MAC) level network. In block B750, a LIF manager (not shown) performs L2 ping from the destination port to the source port. This ensures that the selected destination port is reachable, and there will be no data outage once the migrate operation is complete. The external clients 108 will also be able to communicate through the selected destination port.

If the destination data port has no L2 connectivity to the source data port, then in block B752, the LIF manager checks if there is a subnet object on the destination cluster 328 that maps to the same subnet of the source LIF. If such a subnet object exists, then it picks any port from a broadcast domain associated with the source subnet to create a destination LIF. Prior to migration any IP address space and/or VLAN are created on the destination cluster 328. The number of LIFs created on the destination Vserver 324 are the same as that on the source Vserver 324. Any additional LIFs that need to be created, if the topology of the destination cluster 328 is different from the source cluster 326, are created after the migration is complete. It is noteworthy, that the LIF connectivity checks described herein are optional and the migrate operation can be executed without conducting the LIF connectivity checks. Furthermore, if the source cluster 326 and the destination cluster 328 are not in the same L2 network, the migrate operation can be executed if connectivity is available via a L3 (Level or Layer 3) network that is governed by managing network transmission using IP addresses. As an example, the BGP (Border Gateway Protocol) and virtual IP (VIP) address can be used for LIF migration. The VIP LIFs, being virtual, are not tied to any particular node/port. The prerequisite is the existance of a BGP LIF on each node in the destination cluster 328. BGP is a standardized exterior gateway protocol designed to exchange routing and reachability information among autonomous systems on the Internet. BGP is classified as a path-vector routing protocol, and it makes routing decisions based on paths, configured network policies, or rule-sets.

Figure 7E:
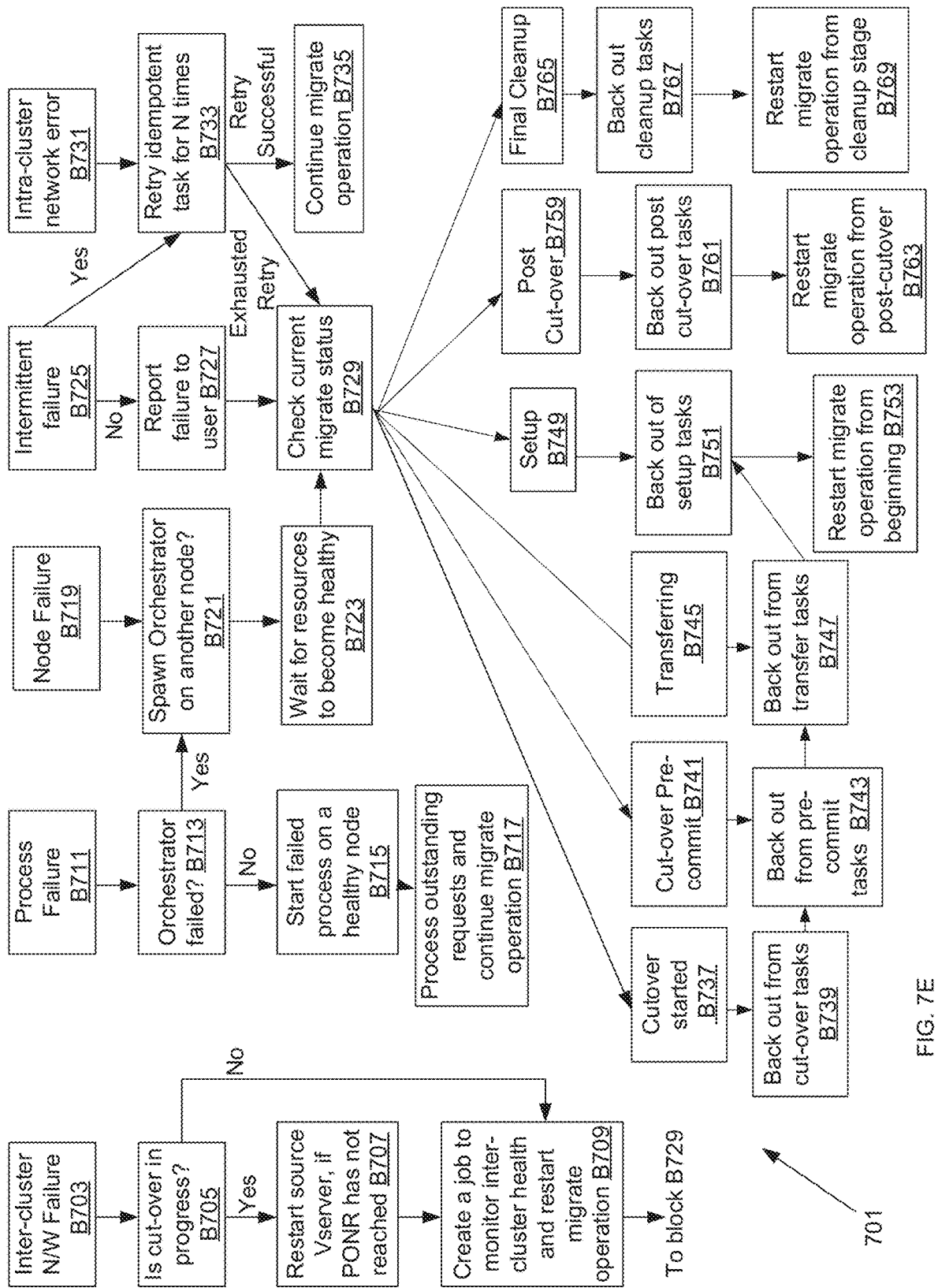
FIG. 7E shows a process flow for failure handling of the migrate operation to migrate the source Vserver to the destination cluster, according to one aspect of the present disclosure.

Migrate Operation Failure Handling 701: FIG. 7E shows an example of a process flow 701 for handling different failure conditions that may occur during the various phases/stages of the migrate operation described above. In one aspect, an inter-cluster network failure may be detected in block B703, while the migration operation is in progress. The inter-cluster, network failure may be detected by a network access layer (e.g., 806, FIG. 8). The inter-cluster network failure may result in a degraded or loss of network connection between the source cluster 326 and the destination cluster 328. The failure may be detected or reported to the failure modules 406A/406B, depending on which cluster or node detects the network failure. In block B705, the process determines if the migration is in the cut-over phase. This information is available from the migrate operation state (FIG. 6) that is stored at RDBs 432A/432B. If yes, then the source Vserver 320 is restarted if the PONR stage has not been reached. If the migrate operation is not in the cut-over phase, then in block B709, a job object is created to monitor the health of the inter-cluster communication. The migrate operation is restarted and the process moves to block B729 that is described below in detail.

As another example, a process involved with the migrate operation may fail in block B711. In block B713, the failure module 406A/406B determines if the failed process is the orchestrator 342. If not, then the failed process is restarted at a healthy node in block B715. Thereafter, in block B717, any outstanding requests for the failed process are processed and the migrate operation continues. If the failed process is the orchestrator 342, then the process moves to block B721, described below.

In block B719, a failure is detected at a destination node (e.g., 335A-335B). The orchestrator 342 is started at a new healthy node in block B721. The migrate operation then waits for the resources at the new node to become available in block B723. The process then moves to block B729, also described below in detail.

In yet another example, the process determines if there is an intermittent failure in block B725. If yes, the process moves to block B733, described below in detail. If not, then the intermittent failure is reported to a client system in block B727 and the process moves to block B729, described below.

In another example, a network error may occur within the source cluster 326 or the destination cluster 328 in block B731. The network error may occur due to software/hardware failure within the affected cluster. In block B733, the migrate operation tries a failing idempotent task for a certain number of times (e.g., N times). If successful, the migrate operation continues, otherwise, the process moves to block B729.

In block B729, a current status of the migrate operation is obtained from the state diagram of FIG. 6 that is updated and stored at RDB 432A/432B. If the migrate operation is in the cut-over phase (B737), then the cut-over tasks are undone in block B739 and the process moves to block B743. If the migrate operation is in the cut-over pre-commit stage (B741), then the pre-commit steps are undone in block B743. If the migrate operation is in the transfer phase (B745), then the transfer phase tasks are undone and the process moves to block B751. If the migrate operation is in the setup configuration phase (B749), then the setup tasks are undone on block B751 and the migrate operation is restarted in block B753.

If the migrate operation is in the post cut-over phase (block B759), then the post cut-over tasks are undone in block B761 and the migrate operation is restarted from the post-cut-over phase in block B763. If the migrate operation is in the final (or source) cleanup stage (B765), then the cleanup tasks are undone in block B767 and the migrate operation is restarted from the cleanup stage.

Figure 7F:
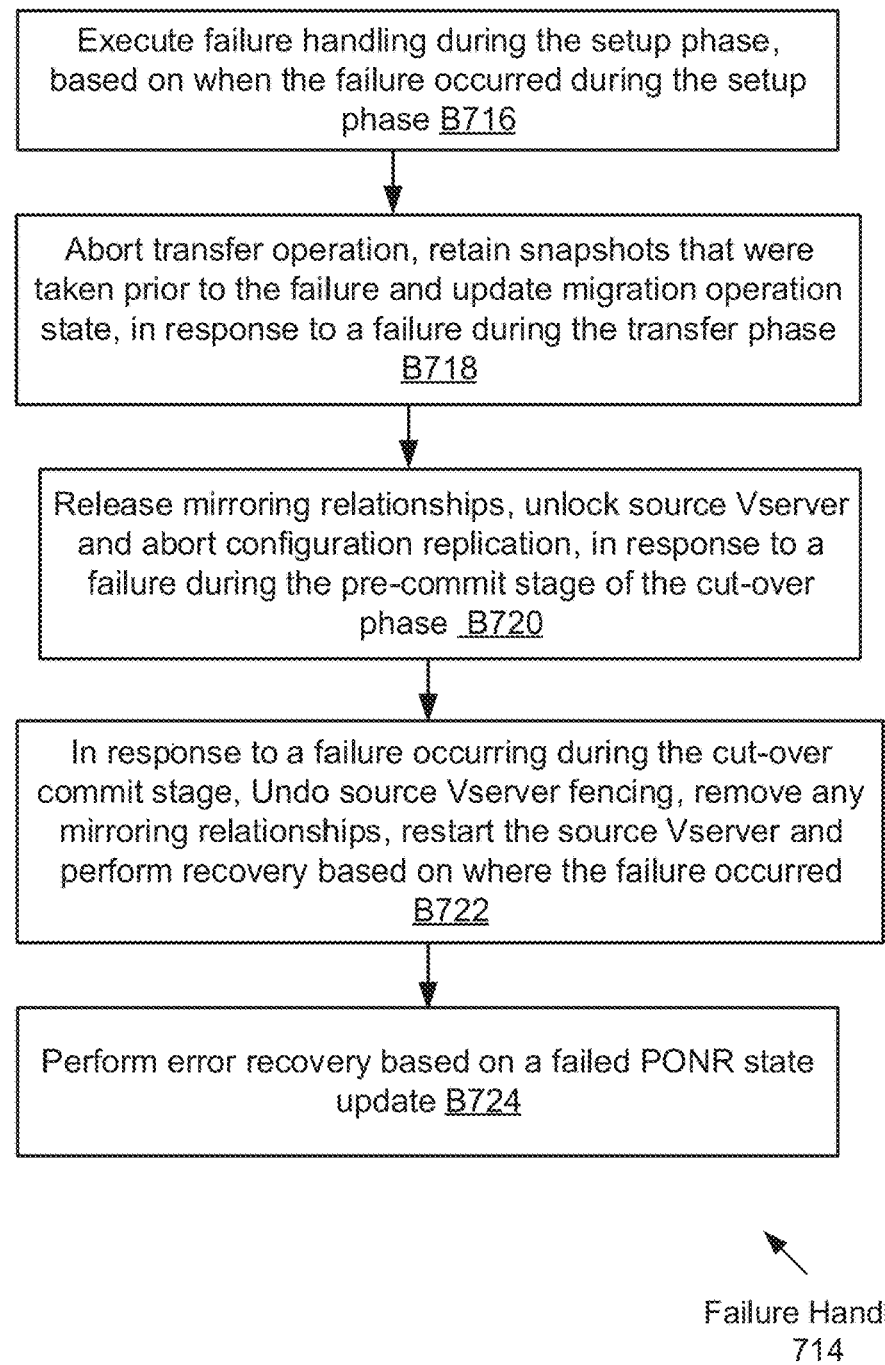
FIG. 7F shows another process flow for failure handling of the migrate operation to migrate the source Vserver to the destination cluster, according to one aspect of the present disclosure.

FIG. 7F shows another process flow 714 to handle the various failure conditions that may occur during a migrate operation. The failure handling is executed by the failure module 406A/406B in conjunction with the other modules, e.g., the orchestrator 342. The migrate operation enters a failed stage when the migrate operation cannot be auto-healed due to failures that may require manual intervention. After an error is fixed, a client system (e.g., 108, FIG. 1) can resume the migrate operation or can abort the migrate operation. The migrate failure handling is similar to the migrate pausing process described above. In another aspect, the failure handling state can be combined with the pause handling operations for failures that occurred prior to the cutover phase. In one aspect, failure handling depends on the state of the migrate operation when the failure occurred, as described below with respects to blocks B716, B718, B720, B722 and B724 of FIG. 7F.

Setup phase Failure Handling (B716): If the migrate operation fails during a pre-check operation; the failure is reported to the user. If the migrate operation fails during an asynchronous pre-check stage, the operation state at the RDB is updated to the "migrate_failed" state with the appropriate reason. If the migrate operation fails after the destination Vserver 324 is created, then the destination Vserver 324 is not deleted but it stays locked. If the migrate operation failed during volume creation at the destination cluster 326, the CRS streams are aborted and the migrate operation state is updated to "migrate_failed" state.

Transfer Phase (B718): If the migrate operation failed during this phase, then the transfer operation to transfer snapshots of the source volumes 428A/430A is aborted, the mirroring relationships are released, the CRS streams are aborted, the snapshots taken during the transfer phase are retained and the migrate operation state is updated to migrate_failed state.

Cutover Pre-Commit (B720): If the migrate operation failed during this stage of the migrate operation, then a transfer operation transferring source volume 428A/430A snapshots is aborted, the mirroring relationships are released, the CRS streams are aborted, the snapshots taken before the failure are retained and the migrate operation state is updated to migrate_failed. If the source Vserver 320 is locked, then it is unlocked.

Cutover Commit (B722): If a failure is triggered on the source cluster 326 e.g., the source cutover timer 412A expired, then PONR updates are disallowed from the destination cluster 328, drain and fence steps are undone on the source cluster 326, if it was already performed and the mirroring relationships are removed. The source Vserver 320 is restarted and unlocked. If the destination cluster 328 cannot communicate with the source cluster 326 to stop the source Vserver, then the source cluster 326 performs its recovery. The destination cluster 328 deletes all the snapshots for the migrate operation, deletes the mirroring relationships, and the migrate operation state is updated to migrate_failed state. If commit stage returns an error, then the source cluster 326 performs the recovery based on the source cutover timer 412A. The snapshots prior to the failure are retained and any cutover commit steps are undone. If any of the destination volumes 428B/430B were configured as read/write volumes, they are rolled back to a read-only state. The final snapshot is also deleted.

Cutover Post Commit (B724): If a PONR state update fails on the source cluster 326, then the source cluster 326 performs its error recovery as explained above. The destination cluster 328 performs the same error recovery as described above. If a PONR update request/response timed out, then the destination cluster 328 assumes that the PONR update didn't make it to the source cluster 326. This will prevent the source Vserver 320 to be brought on-line at both the source and the destination clusters. If PONR update fails at the destination cluster 328, the source cluster 326 will not start the source Vserver 320.

In one aspect, various methods and systems for migrating a Vserver are provided. One method includes generating (B502, by the processor, a consistency group (CG) (e.g., 331, FIG. 3B) having a plurality of source storage volumes (330, FIG. 3B) managed by a source Vserver (320, FIG. 3B) of a source cluster (326, FIG. 3B) for a migrate operation to migrate the plurality of the source storage volumes as a group to a plurality of destination storage volumes (332, FIG. 3B) of a destination cluster (328, FIG. 3B); establishing (B504, FIG. 5A), by the processor, a mirroring relationship between the source cluster and the destination cluster for managing asynchronous transfer of the plurality source storage volumes in the CG to the plurality of destination storage volumes during a transfer phase of the migrate operation; replicating (B518, FIG. 5B), by the processor, a logical interface of the source cluster to the destination cluster, the logical interface providing a network address to access the source cluster; and automatically selecting (FIG. 7C), by the processor, a destination port at the destination cluster, associated with the replicated logical interface. The method further includes determining, by the processor, an inter-cluster failure (B703, FIG. 7E) between the source cluster and the destination occurring while the migrate operation is at a point of no return (PONR); and restarting (B707, FIG. 7E), by the processor, the source Vserver at the source cluster and the migrate operation.

The method further includes undoing (B751, FIG. 7E), by the processor, any tasks executed during a setup phase of the migrate operation, in response to a failure condition occurring during the setup phase; and restarting (B753, FIG. 7E), by the processor, the migrate operation. The method also includes undoing (B718, FIG. 7F), by the processor, any tasks executed during a transfer phase and a setup phase of the migrate operation, in response to a failure condition occurring during the transfer phase; and restarting, by the processor, the migrate operation.

The method also includes undoing (B720, FIG. 7F), by the processor, any tasks executed during a cut-over pre-commit phase, a transfer phase and a setup phase of the migrate operation, in response to a failure condition occurring during the cut-over pre-commit phase; and restarting, by the processor, the migrate operation. The method further includes retrying, by the processor, the task associated with the migrate operation, in response to a network error detected at the source cluster, the destination cluster or both the source and the destination cluster.

In yet another aspect, methods and systems for Vserver migration are provided. One method includes executing (B518, FIG. 5B), by the processor, a transfer phase of a migrate operation for migrating a source Vserver of a source cluster to a destination cluster, the transfer phase using asynchronous baseline transfer to transfer data and configuration of a plurality of source storage volumes configured in a CG for the migrate operation to a plurality of destination storage volumes of a destination cluster, the asynchronous baseline transfer is managed as a group; updating (B540, FIG. 5C), by the processor, a state of each of the plurality of source storage volumes to a sync state indicating completion of a pre-commit phase of the migrate operation to initiate a commit phase of the migrate operation; locking (B548, FIG. 5D), by the processor, the source Vserver to prevent any configuration changes for a certain duration during the commit phase, while persistently maintaining a state of the migrate operation at both the source cluster and destination cluster; generating (B552, FIG. 5D), by the processor, a snapshot of the plurality of destination storage volumes for performing data integrity checks between data stored at the source cluster and migrated data at destination cluster, after completing the commit phase; transitioning (B550, FIG. 5D), by the processor, the migrate operation state to a point of no return state (PONR), upon completing the commit phase and initializing (b552, FIG. 5D) the Vserver at the destination cluster for processing input/output requests; and retaining, by the processor, a snapshot of the source Vserver and restarting the source Vserver, if the migrate operation fails.

The method further includes entering (610, FIG. 6), by the processor, a pause state during the transfer phase of the migration operation; and aborting (618, FIG. 6), by the processor, the migrate operation from the pause state and deleting objects created for the migrate operation. The method further includes applying (B554, FIG. 5D), by the processor, a last configuration of the plurality of source volumes at the destination cluster, after completing the commit phase. The method further includes cancelling (B568, FIG. 5E), by the processor, a timer at the source cluster, in response to reaching the PONR state of the migrate operation, the timer used to track the certain duration for the commit phase.

The method further includes updating (B552, FIG. 5D), by the processor, during the commit phase, configuration of the plurality of destination storage volumes for allowing read and write operations from the destination cluster. The method further includes executing, by the processor, a migrate orchestrator thread (342, FIG. 4B) in a user space (440B, FIG. 4B) of an owning node of the destination cluster for managing tasks associated with the migrate operation. The method further includes executing, by the processor, a failure thread (406B, FIG. 4A) in a user space of an owning node of the destination cluster and in a user space of an owning node of the source cluster for managing failure conditions during the migrate operation.

Methods and systems for Vserver migration are provided. One method includes maintaining (FIG. 6), by the processor, a state of a migrate operation for migrating a plurality of source storage volumes managed by a source Vserver of a source cluster to a plurality of destination storage volumes of a destination cluster of a networked storage environment; restarting (B721, FIG. 7E), by the processor, a process at a healthy node of the source cluster or the destination cluster to continue the migrate operation, in response to detecting an unhealthy node at the source cluster or the destination cluster executing the process; retrying (B733, FIG. 7E), by the processor, a task associated with the migrate operation experiencing intermittent failure for a certain number of times, and upon successful execution, continuing the migration operation; and checking (B729, FIG. 7E), by the processor, the state of the migrate operation and in response to the state of the migrate operation, continuing the migrate operation or restarting the migration operation.

The method further includes determining (B703, FIG. 7E), by the processor, an inter-cluster failure between the source cluster and the destination occurring while the migrate operation is at a point of no return (PONR); and restarting (B707, FIG. 7E), by the processor, the source Vserver at the source cluster and the migrate operation. The method further includes undoing (B751, FIG. 7E), by the processor, any tasks executed during a setup phase of the migrate operation, in response to a failure condition occurring during the setup phase; and restarting (B753, FIG. 7E), by the processor, the migrate operation.

The method further includes undoing (B716 and B718, FIG. 7F), by the processor, any tasks executed during a transfer phase and a setup phase of the migrate operation, in response to a failure condition occurring during the transfer phase; and restarting, by the processor, the migrate operation. The method further includes undoing (B720, FIG. 7F), by the processor, any tasks executed during a cut-over pre-commit phase, a transfer phase and a setup phase of the migrate operation, in response to a failure condition occurring during the cut-over pre-commit phase; and restarting, by the processor, the migrate operation. The method further includes retrying, by the processor, the task associated with the migrate operation, in response to a network error detected at the source cluster, the destination cluster or both the source and the destination cluster.

Operating System: FIG. 8 illustrates a generic example of storage operating system 306 executed by node 208.1, according to one aspect of the present disclosure. The storage operating system 306 manages all the storage volumes and conducts read and write operations.

In one example, storage operating system 306 may include several modules, or "layers" executed by one or both of network module 214 and storage module 216. These layers include a file system manager 800 that keeps track of a directory structure (hierarchy) of the data stored in storage devices and manages read/write operations, i.e., executes read/write operations on storage in response to client 204.1/204.2 requests.

The storage operating system 306 may also include a protocol layer 802 and an associated network access layer 806, to allow node 208.1 to communicate over a network with other systems, such as clients 204.1/204.2. Protocol layer 802 may implement one or more of various higher-level network protocols, such as NFS, CIFS, Hypertext Transfer Protocol (HTTP), TCP/IP and others, as described below.

Network access layer 806 may include one or more drivers, which implement one or more lower-level protocols to communicate over the network, such as Ethernet. Interactions between clients 204.1/204.2 and mass storage devices 212.1 are illustrated schematically as a path, which illustrates the flow of data through operating system 306.

The operating system 306 may also include a storage access layer 804 and an associated storage driver layer 808 to allow the storage module 216 to communicate with a storage device. The storage access layer 804 may implement a higher-level storage protocol, such as RAID, while the storage driver layer 808 may implement a lower-level storage device access protocol, such as FC or SCSI.

As used herein, the term "storage operating system" generally refers to the computer-executable code operable on a computer to perform a storage function that manages data access and may, in the case of a node 208.1, implement data access semantics of a general-purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 9:
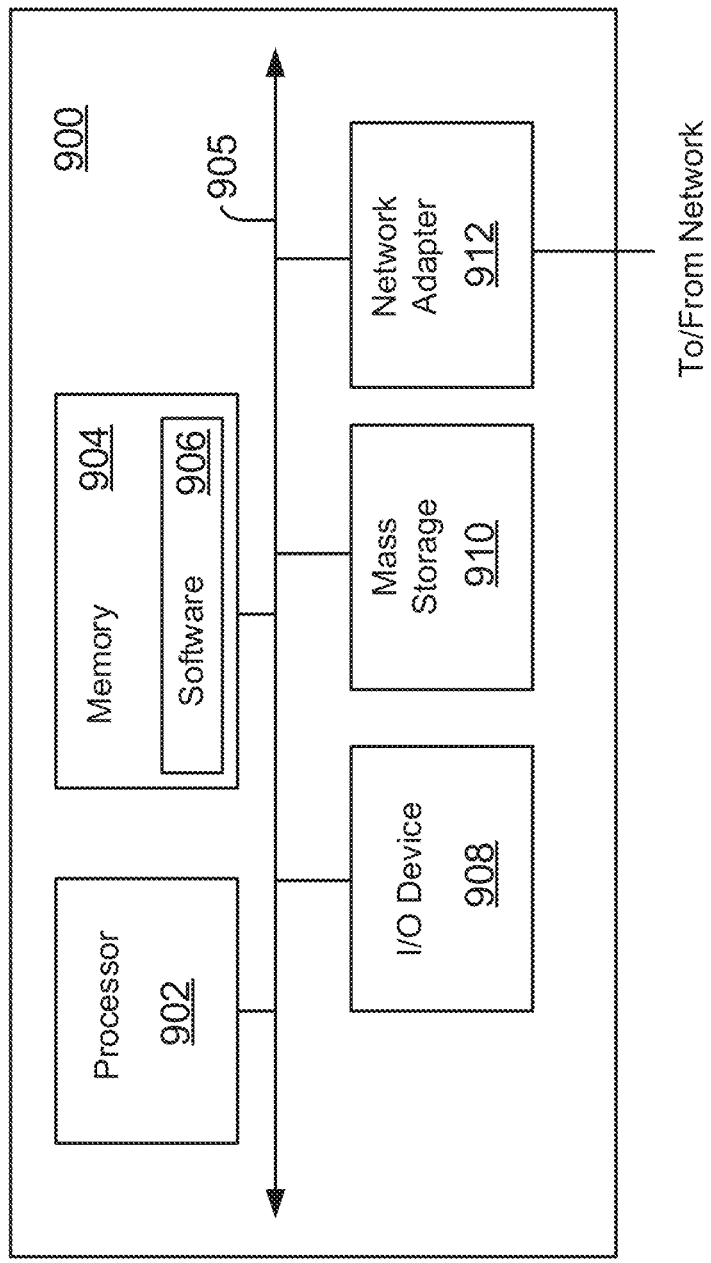
FIG. 9 shows an example of a processing system used according to one aspect of the present disclosure.

Processing System: FIG. 9 is a high-level block diagram showing an example of the architecture of a processing system that may be used according to one aspect. The processing system 900 can represent management system 132, client 104 or storage system 1120, for example. Note that certain standard and well-known components which are not germane to the present invention are not shown in FIG. 9.

The processing system 900 includes one or more processor(s) 902 and memory 904, coupled to a bus system 905. The bus system 905 shown in FIG. 9 is an abstraction that represents any one or more separate physical buses and/or point-to-point connections, connected by appropriate bridges, adapters and/or controllers. The bus system 905, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 902 are the central processing units (CPUs) of the processing system 900 and, thus, control its overall operation. In certain aspects, the processors 902 accomplish this by executing software stored in memory 904. A processor 902 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 904 represents any form of random-access memory (RAM), read-only memory (ROM), flash memory, or the like, or a combination of such devices. Memory 904 includes the main memory of the processing system 900. Software 906 which implements the process steps described above with respect to FIGS. 5A-5F, 6 and 7A-7F may reside in and execute (by processors 902) from memory 904.

Also connected to the processors 902 through the bus system 905 are one or more internal mass storage devices 910, and a network adapter 912. Internal mass storage devices 910 may be or include any conventional medium for storing large volumes of data in a non-volatile manner, such as one or more magnetic or optical based disks. The network adapter 912 provides the processing system 900 with the ability to communicate with remote devices (e.g., storage servers 20) over a network and may be, for example, an Ethernet adapter, a Fibre Channel adapter, or the like.

The processing system 900 also includes one or more input/output (I/O) devices 908 coupled to the bus system 905. The I/O devices 908 may include, for example, a display device, a keyboard, a mouse, etc.

Thus, innovative technology for migrating a storage virtual machine have been described. Note that references throughout this specification to "one aspect" or "an aspect" means that a particular feature, structure, or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the features, structures or characteristics being referred to may be combined as suitable in one or more aspect s of the invention, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
executing, by a processor, a transfer phase of a migrate operation for migrating a source storage virtual machine (Vserver) of a source cluster to a destination cluster, the transfer phase using asynchronous baseline transfer to transfer data and configuration of a plurality of source storage volumes configured in a consistency group (CG) for the migrate operation to a plurality of destination storage volumes of the destination cluster; wherein the asynchronous baseline transfer is managed as a group;
updating, by the processor, a state of each of the plurality of source storage volumes to a sync state indicating completion of a pre-commit phase of the migrate operation to initiate a commit phase of the migrate operation;
locking, by the processor, the source Vserver to prevent any configuration changes for a certain duration during the commit phase, while persistently maintaining a state of the migrate operation at both the source cluster and destination cluster;

generating, by the processor, a snapshot of the plurality of destination storage volumes for performing data integrity checks between data stored at the source cluster and migrated data at the destination cluster, after completing the commit phase;

transitioning, by the processor, the migrate operation state to a point of no return state (PONR), upon completing the commit phase and initializing the Vserver at the destination cluster for processing input/output requests; and retaining, by the processor, a snapshot of the source Vserver and restarting the source Vserver, if the migrate operation fails.

2. The method of claim 1, further comprising:
entering, by the processor, a pause state during the transfer phase of the migration operation; and
aborting, by the processor, the migrate operation from the pause state and deleting objects created for the migrate operation.

3. The method of claim 1, further comprising:
applying, by the processor, a last configuration of the plurality of source volumes at the destination cluster, after completing the commit phase.

4. The method of claim 1, further comprising:
cancelling, by the processor, a timer at the source cluster, in response to reaching the PONR state of the migrate operation, the timer used to track the certain duration for the commit phase.

5. The method of claim 1, further comprising:
updating, by the processor, during the commit phase, configuration of the plurality of destination storage volumes for allowing read and write operations from the destination cluster.

6. The method of claim 1, further comprising:
executing, by the processor, a migrate orchestrator thread in a user space of an owning node of the destination cluster for managing tasks associated with the migrate operation.

7. The method of claim 1, further comprising:
executing, by the processor, a failure thread in a user space of an owning node of the destination cluster and in a user space of an owning node of the source cluster for managing failure conditions during the migrate operation.

8. A non-transitory, machine readable storage medium having stored thereon instructions comprising machine executable code, which when executed by a machine, causes the machine to:

execute a transfer phase of a migrate operation for migrating a source storage virtual machine (Vserver) of a source cluster to a destination cluster, the transfer phase using asynchronous baseline transfer to transfer data and configuration of a plurality of source storage volumes configured in a consistency group (CG) for the migrate operation to a plurality of destination storage volumes of the destination cluster;

wherein the asynchronous baseline transfer is managed as a group;

update a state of each of the plurality of source storage volumes to a sync state indicating completion of a pre-commit phase of the migrate operation to initiate a commit phase of the migrate operation;

lock the source Vserver to prevent any configuration changes for a certain duration during the commit phase, while persistently maintaining a state of the migrate operation at both the source cluster and destination cluster;

generate a snapshot of the plurality of destination storage volumes for performing data integrity checks between data stored at the source cluster and migrated data at the destination cluster, after completing the commit phase;

transition the migrate operation state to a point of no return state (PONR), upon completing the commit phase and initializing the Vserver at the destination cluster for processing input/output requests; and retain a snapshot of the source Vserver and restarting the source Vserver, if the migrate operation fails.

9. The non-transitory, machine readable storage medium of claim 8, wherein the machine executable code further causes the machine to:
enter a pause state during the transfer phase of the migration operation; and abort the migrate operation from the pause state and deleting objects created for the migrate operation.

10. The non-transitory, machine readable storage medium of claim 8, wherein the machine executable code further causes the machine to:
apply a last configuration of the plurality of source volumes at the destination cluster, after completing the commit phase.

11. The non-transitory, machine readable storage medium of claim 8, wherein the machine executable code further causes the machine to:
cancel a timer at the source cluster, in response to reaching the PONR state of the migrate operation, the timer used to track the certain duration for the commit phase.

12. The non-transitory, machine readable storage medium of claim 8, wherein the machine executable code further causes the machine to:
update, during the commit phase, configuration of the plurality of destination storage volumes for allowing read and write operations from the destination cluster.

13. The non-transitory, machine readable storage medium of claim 8, wherein the machine executable code further causes the machine to:
execute a migrate orchestrator thread in a user space of an owning node of the destination cluster for managing tasks associated with the migrate operation.

14. The non-transitory, machine readable storage medium of claim 8, wherein the machine executable code further causes the machine to:
execute a failure thread in a user space of an owning node of the destination cluster and in a user space of an owning node of the source cluster for managing failure conditions during the migrate operation.

15. A system, comprising:
a memory containing machine readable medium comprising machine executable code having stored thereon instructions; and
a processor coupled to the memory to execute the machine executable code to:
execute a transfer phase of a migrate operation for migrating a source storage virtual machine (Vserver) of a source cluster to a destination cluster, the transfer phase using asynchronous baseline transfer to transfer data and configuration of a plurality of source storage volumes configured in a consistency group (CG) for the migrate operation to a plurality of destination storage volumes of the destination cluster;
wherein the asynchronous baseline transfer is managed as a group;

update a state of each of the plurality of source storage volumes to a sync state indicating completion of a pre-commit phase of the migrate operation to initiate a commit phase of the migrate operation;

lock the source Vserver to prevent any configuration changes for a certain duration during the commit phase, while persistently maintaining a state of the migrate operation at both the source cluster and destination cluster;

generate a snapshot of the plurality of destination storage volumes for performing data integrity checks between data stored at the source cluster and migrated data at the destination cluster, after completing the commit phase;

transition the migrate operation state to a point of no return state (PONR), upon completing the commit phase and initializing the Vserver at the destination cluster for processing input/output requests; and retain a snapshot of the source Vserver and restarting the source Vserver, if the migrate operation fails.

16. The system of claim 15, wherein the machine executable code further causes to:

enter a pause state during the transfer phase of the migration operation; and abort the migrate operation from the pause state and deleting objects created for the migrate operation.

17. The system of claim 15, wherein the machine executable code further causes to:

apply a last configuration of the plurality of source volumes at the destination cluster, after completing the commit phase.

18. The system of claim 15, wherein the machine executable code further causes to:

cancel a timer at the source cluster, in response to reaching the PONR state of the migrate operation, the timer used to track the certain duration for the commit phase.

19. The system of claim 15, wherein the machine executable code further causes to:

update, during the commit phase, configuration of the plurality of destination storage volumes for allowing read and write operations from the destination cluster.

20. The system of claim 15, wherein the machine executable code further causes to:

execute a migrate orchestrator thread in a user space of an owning node of the destination cluster for managing tasks associated with the migrate operation.

* * * * *